(12) United States Patent
Sundararajan et al.

(10) Patent No.: US 11,799,821 B2
(45) Date of Patent: *Oct. 24, 2023

(54) SERVICE CHAINS FOR INTER-CLOUD TRAFFIC

(71) Applicant: Cisco Technology, Inc., San Jose, CA (US)

(72) Inventors: Balaji Sundararajan, Fremont, CA (US); Samar Sharma, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 17/471,077

(22) Filed: Sep. 9, 2021

(65) Prior Publication Data

US 2022/0094665 A1 Mar. 24, 2022

Related U.S. Application Data

(63) Continuation of application No. 16/870,130, filed on May 8, 2020, now Pat. No. 11,122,008, which is a
(Continued)

(51) Int. Cl.
*H04L 61/256* (2022.01)
*H04L 45/00* (2022.01)
(Continued)

(52) U.S. Cl.
CPC ............ *H04L 61/256* (2013.01); *H04L 45/22* (2013.01); *H04L 45/306* (2013.01); *H04L 45/38* (2013.01);
(Continued)

(58) Field of Classification Search
CPC ... H04L 61/256; H04L 61/4511; H04L 45/22; H04L 45/306; H04L 45/38; H04L 45/74; H04L 63/101; H04L 41/0893; H04L 45/64
See application file for complete search history.

(56) References Cited

U.S. PATENT DOCUMENTS

| 3,629,512 A | 12/1971 | Yuan |
| 4,769,811 A | 9/1988 | Eckberg, Jr. et al. |

(Continued)

FOREIGN PATENT DOCUMENTS

| CN | 103716123 | 4/2014 |
| CN | 103716137 | 4/2014 |

(Continued)

OTHER PUBLICATIONS

Aldrin, S., et al. "Service Function Chaining Operation, Administration and Maintenance Framework," Internet Engineering Task Force, Oct. 26, 2014, 13 pages.
(Continued)

*Primary Examiner* — Sai Ming Chan
(74) *Attorney, Agent, or Firm* — Polsinelli

(57) ABSTRACT

Systems, methods, and computer-readable media for creating service chains for inter-cloud traffic. In some examples, a system receives domain name system (DNS) queries associated with cloud domains and collects DNS information associated the cloud domains. The system spoofs DNS entries defining a subset of IPs for each cloud domain. Based on the spoofed DNS entries, the system creates IP-to-domain mappings associating each cloud domain with a respective IP from the subset of IPs. Based on the IP-to-domain mappings, the system programs different service chains for traffic between a private network and respective cloud domains. The system routes, through the respective service chain, traffic having a source associated with the
(Continued)

private network and a destination matching the IP in the respective IP-to-domain mapping.

20 Claims, 9 Drawing Sheets

Related U.S. Application Data continuation of application No. 16/001,039, filed on Jun. 6, 2018, now Pat. No. 10,666,612.

(51) Int. Cl.
*H04L 45/302* (2022.01)
*H04L 45/74* (2022.01)
*H04L 9/40* (2022.01)
*H04L 61/4511* (2022.01)
*H04L 41/0893* (2022.01)
*H04L 45/64* (2022.01)

(52) U.S. Cl.
CPC .......... *H04L 45/74* (2013.01); *H04L 61/4511* (2022.05); *H04L 63/101* (2013.01); *H04L 41/0893* (2013.01); *H04L 45/64* (2013.01)

(56) References Cited

U.S. PATENT DOCUMENTS

| | | |
|---|---|---|
| 5,408,231 A | 4/1995 | Bowdon |
| 5,491,690 A | 2/1996 | Alfonsi et al. |
| 5,557,609 A | 9/1996 | Shobatake et al. |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | Mcfarland et al. |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas et al. |
| 7,231,462 B2 | 6/2007 | Berthaud et al. |
| 7,333,990 B1 | 2/2008 | Thiagarajan et al. |
| 7,443,796 B1 | 10/2008 | Albert et al. |
| 7,458,084 B2 | 11/2008 | Zhang et al. |
| 7,472,411 B2 | 12/2008 | Wing et al. |
| 7,486,622 B2 | 2/2009 | Regan et al. |
| 7,536,396 B2 | 5/2009 | Johnson et al. |
| 7,552,201 B2 | 6/2009 | Areddu et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad et al. |
| 7,610,375 B2 | 10/2009 | Portolani et al. |
| 7,643,468 B1 | 1/2010 | Arregoces et al. |
| 7,644,182 B2 | 1/2010 | Banerjee et al. |
| 7,647,422 B2 | 1/2010 | Singh et al. |
| 7,657,898 B2 | 2/2010 | Sadiq |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,751,409 B1 | 7/2010 | Carolan |
| 7,793,157 B2 | 9/2010 | Bailey et al. |
| 7,814,284 B1 | 10/2010 | Glass et al. |
| 7,831,693 B2 | 11/2010 | Lai |
| 7,852,785 B2 | 12/2010 | Lund et al. |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,908,480 B2 | 3/2011 | Firestone et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda et al. |
| 8,095,683 B2 | 1/2012 | Balasubramanian |
| 8,116,307 B1 | 2/2012 | Thesayi et al. |
| 8,166,465 B2 | 4/2012 | Feblowitz et al. |
| 8,180,909 B2 | 5/2012 | Hartman et al. |
| 8,191,119 B2 | 5/2012 | Wing et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,355,332 B2 | 1/2013 | Beaudette et al. |
| 8,442,043 B2 | 5/2013 | Sharma et al. |
| 8,451,817 B2 | 5/2013 | Cheriton |
| 8,464,336 B2 | 6/2013 | Wei et al. |
| 8,479,298 B2 | 7/2013 | Keith et al. |
| 8,498,414 B2 | 7/2013 | Rossi |
| 8,520,672 B2 | 8/2013 | Guichard et al. |
| 8,601,152 B1 | 12/2013 | Chou |
| 8,605,588 B2 | 12/2013 | Sankaran et al. |
| 8,612,612 B1 | 12/2013 | Dukes et al. |
| 8,627,328 B2 | 1/2014 | Mousseau et al. |
| 8,645,952 B2 | 2/2014 | Biswas et al. |
| 8,676,965 B2 | 3/2014 | Gueta |
| 8,676,980 B2 | 3/2014 | Kreeger et al. |
| 8,700,892 B2 | 4/2014 | Bollay et al. |
| 8,724,466 B2 | 5/2014 | Kenigsberg et al. |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian et al. |
| 8,769,057 B1 | 7/2014 | Breau et al. |
| 8,792,490 B2 | 7/2014 | Jabr et al. |
| 8,793,400 B2 | 7/2014 | Mcdysan et al. |
| 8,812,730 B2 | 8/2014 | Vos et al. |
| 8,819,419 B2 | 8/2014 | Carlson et al. |
| 8,825,070 B2 | 9/2014 | Akhtar et al. |
| 8,830,834 B2 | 9/2014 | Sharma et al. |
| 8,904,037 B2 | 12/2014 | Haggar et al. |
| 8,984,284 B2 | 3/2015 | Purdy, Sr. et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | Mcdysan |
| 9,178,812 B2 | 11/2015 | Guichard et al. |
| 9,189,285 B2 | 11/2015 | Ng et al. |
| 9,203,711 B2 | 12/2015 | Agarwal et al. |
| 9,253,274 B2 | 2/2016 | Quinn et al. |
| 9,300,585 B2 | 3/2016 | Kumar et al. |
| 9,311,130 B2 | 4/2016 | Christenson et al. |
| 9,319,324 B2 | 4/2016 | Beheshti-Zavareh et al. |
| 9,325,565 B2 | 4/2016 | Yao et al. |
| 9,325,735 B1 | 4/2016 | Xie et al. |
| 9,338,097 B2 | 5/2016 | Anand et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,385,950 B2 | 7/2016 | Quinn et al. |
| 9,398,486 B2 | 7/2016 | La Roche, Jr. et al. |
| 9,407,540 B2 | 8/2016 | Kumar et al. |

(56) References Cited

U.S. PATENT DOCUMENTS

| | | |
|---|---|---|
| 9,413,655 B2 | 8/2016 | Shatzkamer et al. |
| 9,424,065 B2 | 8/2016 | Singh et al. |
| 9,436,443 B2 | 9/2016 | Chiosi et al. |
| 9,473,570 B2 | 10/2016 | Bhanujan et al. |
| 9,479,443 B2 | 10/2016 | Bosch et al. |
| 9,491,094 B2 | 11/2016 | Patwardhan et al. |
| 9,537,836 B2 | 1/2017 | Mailer et al. |
| 9,558,029 B2 | 1/2017 | Behera et al. |
| 9,559,970 B2 | 1/2017 | Kumar et al. |
| 9,571,405 B2 | 2/2017 | Pignataro et al. |
| 9,608,896 B2 | 3/2017 | Kumar et al. |
| 9,660,909 B2 | 5/2017 | Guichard et al. |
| 9,723,106 B2 | 8/2017 | Shen et al. |
| 9,774,533 B2 | 9/2017 | Zhang et al. |
| 9,794,379 B2 | 10/2017 | Kumar et al. |
| 9,882,776 B2 | 1/2018 | Aybay et al. |
| 2001/0023442 A1 | 9/2001 | Masters |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0026257 A1 | 2/2003 | Xu et al. |
| 2003/0037070 A1 | 2/2003 | Marston |
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0226142 A1 | 12/2003 | Rand |
| 2004/0109412 A1 | 6/2004 | Hansson et al. |
| 2004/0148391 A1 | 7/2004 | Shannon, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0094684 A1 | 4/2009 | Chinnusamy et al. |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1 | 3/2010 | Khalid |
| 2010/0080226 A1 | 4/2010 | Khalid |
| 2010/0165985 A1 | 7/2010 | Sharma et al. |
| 2010/0191612 A1 | 7/2010 | Raleigh |
| 2011/0023090 A1 | 1/2011 | Asati et al. |
| 2011/0032833 A1 | 2/2011 | Zhang et al. |
| 2011/0055845 A1 | 3/2011 | Nandagopal et al. |
| 2011/0131338 A1 | 6/2011 | Hu |
| 2011/0137991 A1 | 6/2011 | Russell |
| 2011/0142056 A1 | 6/2011 | Manoj |
| 2011/0161494 A1 | 6/2011 | Mcdysan et al. |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2012/0131662 A1 | 5/2012 | Kuik et al. |
| 2012/0147894 A1 | 6/2012 | Mulligan et al. |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0036307 A1* | 2/2013 | Gagliano ............... H04L 9/321 713/171 |
| 2013/0040640 A1 | 2/2013 | Chen et al. |
| 2013/0044636 A1 | 2/2013 | Koponen et al. |
| 2013/0103939 A1* | 4/2013 | Radpour ............... H04W 12/50 713/152 |
| 2013/0121137 A1 | 5/2013 | Feng et al. |
| 2013/0124708 A1 | 5/2013 | Lee et al. |
| 2013/0148541 A1 | 6/2013 | Zhang et al. |
| 2013/0163594 A1 | 6/2013 | Sharma et al. |
| 2013/0163606 A1 | 6/2013 | Bagepalli et al. |
| 2013/0238806 A1 | 9/2013 | Moen |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0067758 A1 | 3/2014 | Boldyrev et al. |
| 2014/0105062 A1 | 4/2014 | McDysan et al. |
| 2014/0136675 A1 | 5/2014 | Yao et al. |
| 2014/0254603 A1 | 9/2014 | Banavalikar et al. |
| 2014/0259012 A1 | 9/2014 | Nandlall et al. |
| 2014/0279863 A1 | 9/2014 | Krishnamurthy et al. |
| 2014/0280836 A1 | 9/2014 | Kumar et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard et al. |
| 2014/0344399 A1 | 11/2014 | Lipstone et al. |
| 2014/0344439 A1 | 11/2014 | Kempf et al. |
| 2014/0362682 A1 | 12/2014 | Guichard et al. |
| 2014/0362857 A1 | 12/2014 | Guichard et al. |
| 2014/0369209 A1 | 12/2014 | Khurshid et al. |
| 2014/0376558 A1 | 12/2014 | Rao et al. |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0071285 A1 | 3/2015 | Kumar et al. |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |
| 2015/0103827 A1 | 4/2015 | Quinn et al. |

(56) References Cited

U.S. PATENT DOCUMENTS

| | | |
|---|---|---|
| 2015/0117308 A1 | 4/2015 | Kant |
| 2015/0124622 A1 | 5/2015 | Kovvali et al. |
| 2015/0131484 A1 | 5/2015 | Aldrin |
| 2015/0131660 A1 | 5/2015 | Shepherd et al. |
| 2015/0156035 A1 | 6/2015 | Foo et al. |
| 2015/0180725 A1 | 6/2015 | Varney et al. |
| 2015/0180767 A1 | 6/2015 | Tam et al. |
| 2015/0181309 A1 | 6/2015 | Shepherd et al. |
| 2015/0188949 A1 | 7/2015 | Mahaffey et al. |
| 2015/0195197 A1 | 7/2015 | Yong et al. |
| 2015/0222516 A1 | 8/2015 | Deval et al. |
| 2015/0222533 A1 | 8/2015 | Birrittella et al. |
| 2015/0236948 A1 | 8/2015 | Dunbar et al. |
| 2015/0319078 A1 | 11/2015 | Lee et al. |
| 2015/0319081 A1 | 11/2015 | Kasturi et al. |
| 2015/0326473 A1 | 11/2015 | Dunbar et al. |
| 2015/0333930 A1 | 11/2015 | Aysola et al. |
| 2015/0334027 A1 | 11/2015 | Bosch et al. |
| 2015/0341285 A1 | 11/2015 | Aysola et al. |
| 2015/0365324 A1 | 12/2015 | Kumar et al. |
| 2015/0365495 A1 | 12/2015 | Fan et al. |
| 2015/0381465 A1 | 12/2015 | Narayanan et al. |
| 2015/0381557 A1 | 12/2015 | Fan et al. |
| 2016/0021026 A1 | 1/2016 | Aron et al. |
| 2016/0028604 A1 | 1/2016 | Chakrabarti et al. |
| 2016/0028640 A1 | 1/2016 | Zhang et al. |
| 2016/0043952 A1 | 2/2016 | Zhang et al. |
| 2016/0050132 A1 | 2/2016 | Zhang |
| 2016/0080263 A1 | 3/2016 | Park et al. |
| 2016/0080496 A1 | 3/2016 | Falanga et al. |
| 2016/0099853 A1 | 4/2016 | Nedeltchev et al. |
| 2016/0119159 A1 | 4/2016 | Zhao et al. |
| 2016/0119253 A1 | 4/2016 | Kang et al. |
| 2016/0127139 A1 | 5/2016 | Tian et al. |
| 2016/0134518 A1 | 5/2016 | Callon et al. |
| 2016/0134535 A1 | 5/2016 | Callon |
| 2016/0139939 A1 | 5/2016 | Bosch et al. |
| 2016/0164776 A1 | 6/2016 | Biancaniello |
| 2016/0164826 A1 | 6/2016 | Riedel et al. |
| 2016/0165014 A1 | 6/2016 | Nainar et al. |
| 2016/0173373 A1 | 6/2016 | Guichard et al. |
| 2016/0173464 A1 | 6/2016 | Wang et al. |
| 2016/0182336 A1 | 6/2016 | Doctor et al. |
| 2016/0182342 A1 | 6/2016 | Singaravelu et al. |
| 2016/0182684 A1 | 6/2016 | Connor et al. |
| 2016/0212017 A1 | 7/2016 | Li et al. |
| 2016/0226742 A1 | 8/2016 | Apathotharanan et al. |
| 2016/0248685 A1 | 8/2016 | Pignataro et al. |
| 2016/0285720 A1 | 9/2016 | Mäenpää et al. |
| 2016/0323165 A1 | 11/2016 | Boucadair et al. |
| 2016/0352629 A1 | 12/2016 | Wang et al. |
| 2016/0380966 A1 | 12/2016 | Gunnalan et al. |
| 2017/0019303 A1 | 1/2017 | Swamy et al. |
| 2017/0031804 A1 | 2/2017 | Ciszewski et al. |
| 2017/0041332 A1* | 2/2017 | Mahjoub ............ H04L 43/0876 |
| 2017/0078175 A1 | 3/2017 | Xu et al. |
| 2017/0187609 A1 | 6/2017 | Lee et al. |
| 2017/0208000 A1 | 7/2017 | Bosch et al. |
| 2017/0214627 A1 | 7/2017 | Zhang et al. |
| 2017/0237656 A1 | 8/2017 | Gage et al. |
| 2017/0250917 A1 | 8/2017 | Ruckstuhl et al. |
| 2017/0257386 A1* | 9/2017 | Kim ................... H04L 63/1458 |
| 2017/0272470 A1 | 9/2017 | Gundamaraju et al. |
| 2017/0279712 A1 | 9/2017 | Nainar et al. |
| 2017/0310611 A1 | 10/2017 | Kumar et al. |
| 2017/0317932 A1* | 11/2017 | Paramasivam ........ G06F 9/5083 |
| 2017/0374088 A1* | 12/2017 | Pappu ................. H04L 61/4511 |
| 2018/0026884 A1 | 1/2018 | Nainar et al. |
| 2018/0041470 A1 | 2/2018 | Schultz et al. |
| 2018/0219783 A1 | 8/2018 | Pfister et al. |
| 2018/0352038 A1 | 12/2018 | Sathyanarayana et al. |

FOREIGN PATENT DOCUMENTS

| | | |
|---|---|---|
| CN | 10381277 B | 5/2014 |
| EP | 2731314 A1 | 5/2014 |
| EP | 3160073 | 4/2017 |
| JP | 2016149686 | 8/2016 |
| WO | WO 2011/029321 | 3/2011 |
| WO | WO 2012/056404 | 5/2012 |
| WO | WO 2015/180559 | 12/2015 |
| WO | WO 2015/187337 | 12/2015 |
| WO | WO 2016/004556 | 1/2016 |
| WO | WO 2016/058245 | 4/2016 |

OTHER PUBLICATIONS

Alizadeh, Mohammad, et al., "CONGA: Distributed Congestion-Aware Load Balancing for Datacenters," SIGCOMM '14, Aug. 17-22, 2014, 12 pages.

Author Unknown, "ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.

Author Unknown, "AWS Lambda Developer Guide," Amazon Web Services Inc., May 2017, 416 pages.

Author Unknown, "CEA-708," from Wikipedia, the free encyclopedia, Nov. 15, 2012; 16 pages http://en.wikipedia.org/w/index.php?title=CEA-708&oldid=523143431.

Author Unknown, "Cisco and Intel High-Performance VNFs on Cisco NFV Infrastructure," White Paper, Cisco and Intel, Oct. 2016, 7 pages.

Author Unknown, "Cloud Functions Overview," Cloud Functions Documentation, Mar. 21, 2017, 3 pages; https://cloud.google.com/functions/docs/concepts/overview.

Author Unknown, "Cloud-Native VNF Modelling," Open Source Mano, © ETSI 2016, 18 pages.

Author Unknown, "Digital Program Insertion," from Wikipedia, the free encyclopedia, Jan. 2, 2012; 1 page http://en.wikipedia.org/w/index.php?title=Digital_Program_Insertion&oldid=469076482.

Author Unknown, "Dynamic Adaptive Streaming over HTTP," from Wikipedia, the free encyclopedia, Oct. 25, 2012; 3 pages, http://en.wikipedia.org/w/index.php?title=Dynannic_Adaptive_Streanning_over_HTTP&oldid=519749189.

Author Unknown, "GStreamer and in-band metadata," from RidgeRun Developer Connection, Jun. 19, 2012, 5 pages https://developersidgerun.conn/wiki/index.php/GStreanner_and_in-band_nnetadata.

Author Unknown, "IEEE Standard for the Functional Architecture of Next Generation Service Overlay Networks, IEEE Std. 1903-2011," IEEE, Piscataway, NJ, Oct. 7, 2011; 147 pages.

Author Unknown, "ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.

Author Unknown, "M-PEG 2 Transmission," © Dr. Gorry Fairhurst, 9 pages [Published on or about Jan. 12, 2012] http://www.erg.abdn.ac.uk/future-net/digital-video/mpeg2-trans.html.

Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.

Author Unknown, "Network Functions Virtualisation (NFV); Use Cases," ETSI, GS NFV 001 v1.1.1, Architectural Framework, © European Telecommunications Standards Institute, Oct. 2013, 50 pages.

Author Unknown, "OpenNebula 4.6 User Guide," Jun. 12, 2014, opennebula.org, 87 pages.

Author Unknown, "Understanding Azure, A Guide for Developers," Microsoft Corporation, Copyright © 2016 Microsoft Corporation, 39 pages.

Author Unknown, "3GPP TR 23.803 V7.0.0 (Sep. 2005) Technical Specification: Group Services and System Aspects; Evolution of Policy Control and Charging (Release 7)," 3rd Generation Partner-

(56) References Cited

OTHER PUBLICATIONS ship Project (3GPP), 650 Route des Lucioles—Sophia Antipolis Val bonne—France, Sep. 2005; 30 pages.
Author Unknown, "3GPP TS 23.203 V8.9.0 (Mar. 2010) Technical Specification: Group Services and System Aspects; Policy and Charging Control Architecture (Release 8)," 3rd Generation Partnership Project (3GPP), 650 Route des Lucioles—Sophia Antipolis Val bonne—France, Mar. 2010; 116 pages.
Author Unknown, "3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis Valbonne—France, Dec. 2015, 337 pages.
Author Unknown, "3GPP TS 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9)," 3rd Generation Partnership Project (3GPP), 650 Route des Lucioles—Sophia Antipolis Valbonne—France, Jun. 2010; 259 pages.
Author Unknown, "3GPP TS 29.212 V13.1.0 (Mar. 2015) Technical Specification: 3rd Generation Partnership Project; Technical Specification Group Core Network and Terminals; Policy and Charging Control (PCC); Reference points (Release 13)," 3rd Generation Partnership Project (3GPP), 650 Route des Lucioles—Sophia Antipolis Valbonne—France, Mar. 2015; 230 pages.
Author Unknown, "Service-Aware Network Architecture Based on SDN, NFV, and Network Intelligence," 2014, 8 pages.
Baird, Andrew, et al. "AWS Serverless Multi-Tier Architectures; Using Amazon API Gateway and AWS Lambda," Amazon Web Services Inc., Nov. 2015, 20 pages.
Bi, Jing, et al., "Dynamic Provisioning Modeling for Virtualized Multi-tier Applications in Cloud Data Center," 2010 IEEE $3^{rd}$ International Conference on Cloud Computing, Jul. 5, 2010, pp. 370-377, IEEE Computer Society.
Bitar, N., et al., "Interface to the Routing System (I2RS) for the Service Chaining: Use Cases and Requirements," draft-bitar-i2rs-service-chaining-01, Feb. 14, 2014, pp. 1-15.
Boucadair, Mohamed, et al., "Differentiated Service Function Chaining Framework," Network Working Group Internet Draft draft-boucadair-network-function-chaining-03, Aug. 21, 2013, 21 pages.
Bremler-Barr, Anat, et al., "Deep Packet Inspection as a Service," CoNEXT '14, Dec. 2-5, 2014, pp. 271-282.
Cisco Systems, Inc. "Cisco NSH Service Chaining Configuration Guide," Jul. 28, 2017, 11 pages.
Cisco Systems, Inc. "Cisco VN-LINK: Virtualization-Aware Networking," 2009, 9 pages.
Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.
Ersue, Mehmet, "ETSI NFV Management and Orchestration—An Overview," Presentation at the IETF#88 Meeting, Nov. 3, 2013, 14 pages.
Farrel, A., et al., "A Path Computation Element (PCE)—Based Architecture," RFC 4655, Network Working Group, Aug. 2006, 40 pages.
Fayaz, Seyed K., et al., "Efficient Network Reachability Analysis using a Succinct Control Plane Representation," 2016, ratul.org, pp. 1-16.
Halpern, Joel, et al., "Service Function Chaining (SFC) Architecture," Internet Engineering Task Force (IETF), Cisco, Oct. 2015, 32 pages.
Hendrickson, Scott, et al. "Serverless Computation with OpenLambda," Elastic 60, University of Wisconsin, Madison, Jun. 20, 2016, 7 pages, https://www.usenix.org/svstem/files/conference/hotcloud16/hotcloud16_hendrickson.pdf.

Jiang, Y., et al., "An Architecture of Service Function Chaining," IETF Network Working Group Internet Draft, draft-jiang-sfc-arch-01.txt, Feb. 14, 2014; 12 pages.
Jiang, Yuanlong, et al., "Fault Management in Service Function Chaining," Network Working Group, China Telecom, Oct. 16, 2015, 13 pages.
Katsikas, Goergios P., et al., "Profiling and accelerating commodity NFV service chains with SCC," The Journal of Systems and Software, vol. 127, Jan. 2017, pp. 12-27.
Kumar, Surendra, et al., "Service Function Path Optimization: draft-kumar-sfc-sfp-optimization-00.txt," Internet Engineering Task Force, IETF; Standard Working Draft, May 10, 2014, 14 pages.
Kumbhare, Abhijit, et al., "Opendaylight Service Function Chaining Use-Cases," Oct. 14, 2014, 25 pages.
Li, Hongyu, "Service Function Chaining Use Cases", IETF 88 Vancouver, Nov. 7, 2013, 7 pages.
Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.
Newman, David, "Review: FireEye fights off multi-stage malware," Network World, May 5, 2014, 7 pages.
Nguyen, Kim-Khoa, et al. "Distributed Control Plane Architecture of Next Generation IP Routers," IEEE, 2009, 8 pages.
Penno, Reinaldo, et al. "Packet Generation in Service Function Chains," draft-penno-sfc-packet-03, Apr. 29, 2016, 25 pages.
Penno, Reinaldo, et al. "Services Function Chaining Traceroute," draft-penno-sfc-trace-03, Sep. 30, 2015, 9 pages.
Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02/22/openwhisk-a-quick-tech-preview/.
Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.
Quinn, P., et al., "Network Service Header," Network Working Group, Mar. 24, 2015, 42 pages; https://tools.ietf.org/pdf/draft-ietf-sfc-nsh-00.pdf.
Quinn, P., et al., "Network Service Chaining Problem Statement," draft-quinn-nsc-problem-statement-03.txt, Aug. 26, 2013, 18 pages.
Quinn, Paul, et al., "Network Service Header," Network Working Group, draft-quinn-sfc-nsh-02.txt, Feb. 14, 2014, 21 pages.
Quinn, Paul, et al., "Network Service Header," Network Working Group, draft-quinn-nsh-00.txt, Jun. 13, 2013, 20 pages.
Quinn, Paul, et al., "Network Service Header," Network Working Group Internet Draft draft-quinn-nsh-01, Jul. 12, 2013, 20 pages.
Quinn, Paul, et al., "Service Function Chaining (SFC) Architecture," Network Working Group Internet Draft draft-quinn-sfc-arch-05.txt, May 5, 2014, 31 pages.
Quinn, Paul, et al., "Service Function Chaining: Creating a Service Plane via Network Service Headers," IEEE Computer Society, 2014, pp. 38-44.
Wong, Fei, et al., "SMPTE-TT Embedded in ID3 for HTTP Live Streaming, draft-smpte-id3-http-live-streaming-00," Informational Internet Draft, Jun. 2012, 7 pages http://tools.ietf.org/htnnl/draft-snnpte-id3-http-live-streaming-00.
Yadav, Rishi, "What Real Cloud-Native Apps Will Look Like," Crunch Network, posted Aug. 3, 2016, 8 pages; https://techcrunch.com/2016/08/03/what-real-cloud-native-apps-will-look-like/.
Zhang, Ying, et al. "StEERING: A Software-Defined Networking for Inline Service Chaining," IEEE, 2013, IEEE, p. 10 pages.
International Search Report and Written Opinion from the International Searching Authority, dated Aug. 5, 2019, 12 pages, for corresponding International Patent Application No. PCT/US19/35172.
Chinese Office Action for Application No. 201980037508.X, dated Jan. 17, 2022, 14 pages.

* cited by examiner

SERVICE CHAINS FOR INTER-CLOUD TRAFFIC

CROSS-REFERENCE TO RELATED APPLICATIONS

This application is a continuation of U.S. Non-Provisional patent application Ser. No. 16/870,130, filed on May 8, 2020, which is a continuation of U.S. Non-Provisional patent application Ser. No. 16/001,039, filed on Jun. 6, 2018, now U.S. Pat. No. 10,666,612, the full disclosures of each are incorporated herein by reference in their entireties.

TECHNICAL FIELD

The present technology pertains to service chaining and, more specifically, creating service chains for inter-cloud traffic.

BACKGROUND

Service chaining allows network operators to steer traffic for a given application through various appliances, such as firewalls, WAN optimizers, and Intrusion Prevention Systems (IPSs), which together enforce specific policies and provide a desired functionality for the traffic. The appliances in a service chain can be "chained" together in a particular sequence along the path of the traffic to process the traffic through the sequence of appliances. For example, a network operator may define a service chain including a firewall and a WAN optimizer for traffic associated with an application. When such traffic is received, it is first routed to the firewall in the service chain, which provides firewall capabilities such as deep packet inspection and access control. After the traffic is processed by the firewall, it is routed to the WAN optimizer in the service chain, which can compress the traffic, apply quality-of-service (QoS) policies, or perform other traffic optimization functionalities. Once the traffic is processed by the WAN optimizer, it is routed towards its intended destination.

To implement a service chain, the network operator can program rules or policies for redirecting an application's traffic through a sequence of appliances in the service chain. For example, the network provider can program an access control list (ACL) in the network device's hardware, such as the network device's Ternary Content Addressable Memory (TCAM). The ACL can include entries which together specify the sequence of appliances in the service chain for the application's traffic. The ACL entries can identify specific addresses associated with the application's traffic, such as origin or destination IP addresses associated with the application's traffic, which the network device can use to match an ACL entry to traffic. The network device can then use the ACL entries to route the application's traffic through the sequence of appliances in the service chain.

Unfortunately, however, programming service chains on the network device for each IP allocated to a cloud provider or service can be prohibitive. Cloud providers typically have a very large number of IP addresses allocated for their domains and services. Moreover, the hardware capacity (e.g., TCAM capacity) on a network device is limited and typically insufficient to implement service chains for each cloud provider IP. This problem is compounded when dealing with inter-cloud traffic which involves an even higher number of IP addresses from both the origin and destination clouds, thus increasing the number of service chain entries necessary to program service chains for the inter-cloud traffic. As a result, network devices generally lack the hardware capacity to implement service chains for each origin and destination cloud IP. Consequently, network operators are frequently unable to program service chains on a network device based on the origin and destination clouds of inter-cloud traffic.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
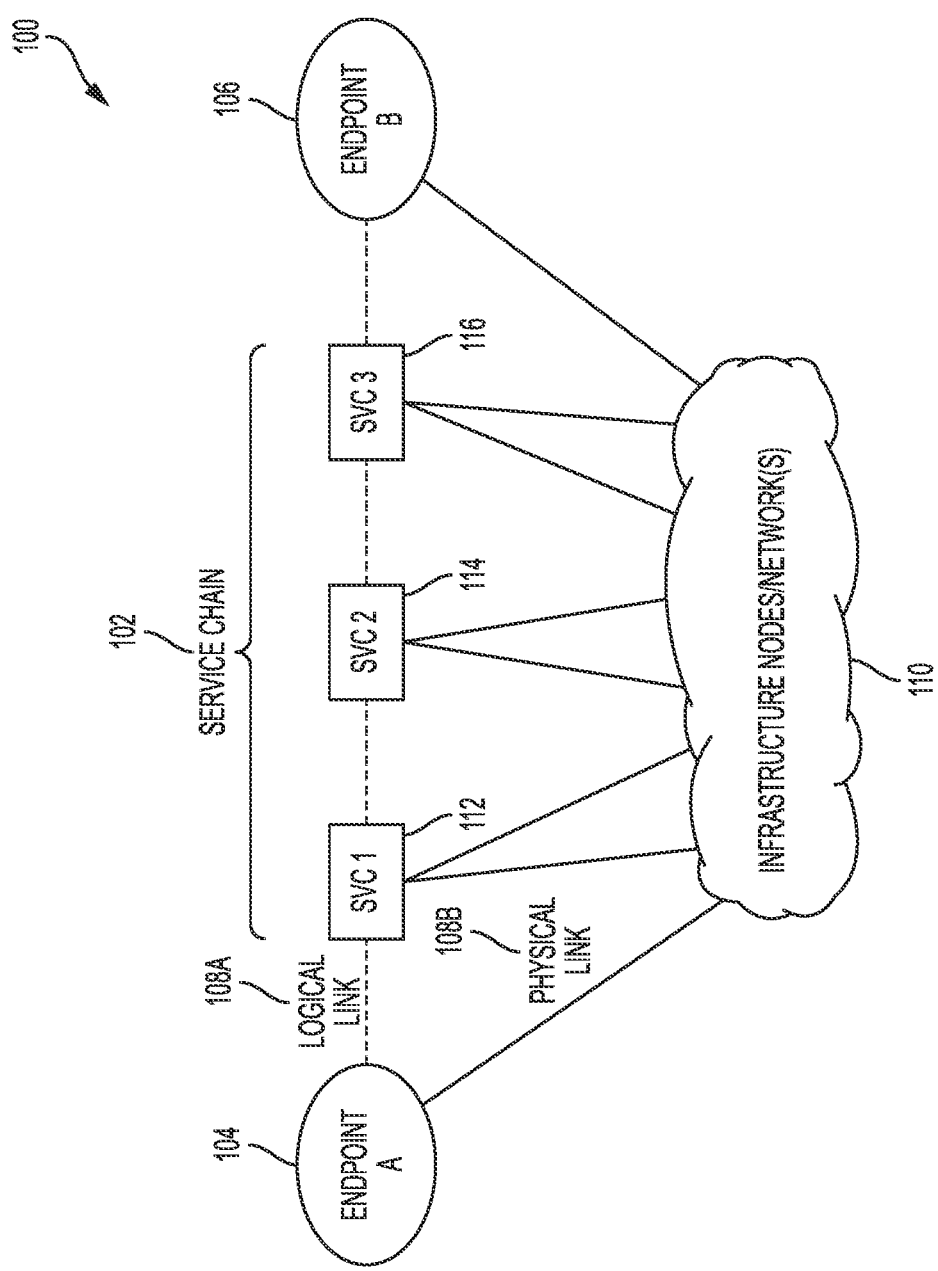
FIG. 1 illustrates a block diagram of an example service chain configuration for application traffic.

Various aspects of the disclosure are discussed in detail below. Features of one aspect may be applied to each aspect alone or in combination with other aspects. Moreover, while specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description.

As used herein, "one embodiment" or "an embodiment" can refer to the same embodiment or any embodiment(s). Moreover, reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Features described herein with reference to one embodiment can be combined with features described with reference to any embodiment.

The terms used in this specification generally have their ordinary meanings in the art, within the context of the disclosure and the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification, including examples of any terms discussed herein, is illustrative and not intended to limit the scope and meaning of the disclosure or any example term. Likewise, the disclosure is not limited to the specific embodiments or examples described in this disclosure.

Without an intent to limit the scope of the disclosure, examples of instruments, apparatus, methods and their related functionalities are provided below. Titles or subtitles may be used in the examples for convenience of a reader, and in no way should limit the scope of the disclosure. Unless otherwise defined, technical and scientific terms used herein have the meaning as commonly understood by one of ordinary skill in the art to which this disclosure pertains. In the case of a conflict, the present document and included definitions will control.

Additional features and advantages of the disclosure will be set forth in the description which follows, and in part will be recognized from the description, or can be learned by practice of the herein disclosed principles. The features and advantages of the disclosure can be realized and obtained by means of the instruments and combinations particularly pointed out herein. These and other features of the disclosure will become more fully apparent from the following description and appended claims, or can be learned by the practice of the principles set forth herein.

Overview

Disclosed are systems, methods, and computer-readable media for creating service chains for inter-cloud traffic. In some examples, a system, such as a switch, can receive an indication of respective service chains to be configured for traffic between a private network site (e.g., private cloud or data center) and respective cloud domains (e.g., public clouds). The indication can be specified by a cloud consumer/customer, and can define the respective service chains, including the services in the respective service chains, and the destination cloud domains associated with the respective service chains.

The system can receive, from one or more endpoints (e.g., servers, applications, devices, etc.) on the private network site, domain name system (DNS) queries associated with respective cloud domains. The system can forward the DNS queries associated with the respective cloud domains to one or more DNS servers and receive one or more DNS resolution results from the one or more DNS servers. The system can send, to the one or more endpoints on the private network site, one or more DNS responses to the DNS queries, which can identify one or more IP addresses associated with the respective cloud domains.

Based on the DNS queries, the system can collect DNS information associated with the respective cloud domains. In some examples, the system can snoop the DNS queries and/or associated DNS resolution results to identify IP information corresponding to the respective cloud domains. Moreover, the system can spoof DNS entries associated with the respective cloud domains. The spoofed DNS entries can define a reduced number of IP addresses for each respective cloud domain. The reduced number of IP addresses is smaller than a total number of IP addresses allocated/registered to the respective cloud domain. In some examples, the reduced number of IP addresses associated with the respective cloud domain can be a subset of the total number of IP addresses allocated to the respective cloud domain. The subset of the total number of IP addresses allocated to the respective cloud domain can be identified or selected from the one or more DNS resolution results.

Based on the spoofed DNS entries, the system can create respective IP-to-domain mappings for the respective cloud domains. Each respective IP-to-domain mapping can associate the respective cloud domain with an IP address from the reduced number of IP addresses associated with the respective cloud domain. The IP address can be, for example, a virtual or private IP address allocated by the system for the respective cloud domain or a public IP registered to the respective cloud domain and identified by snooping the DNS resolution results associated with the DNS queries.

Based on the respective IP-to-domain mappings, the system can program the respective service chains for traffic between the private network site and the respective cloud domains. Each respective service chain can be programmed for traffic from the private network site or a segment from the private network site (e.g., one or more endpoints in the private network site), as well as a respective cloud domain or cloud domain service.

Moreover, each respective service chain can be programmed on hardware (e.g., TCAM) via one or more policies (e.g., Access Control List entries) configured to route, through the respective service chain, traffic having source information associated with the private network site (e.g., an IP or subnet associated with the private network site and/or one or more endpoints in the private network site) and destination information matching the IP address in the respective IP-to-domain mapping associated with the respective cloud domain. In some cases, programming the respective service chains can include programming respective cloud service names for the respective cloud services and associating at least one of the respective service chains or the IP-to-domain mappings with the respective cloud service names.

When the system receives traffic, it can perform a lookup to determine if the traffic matches any of the programmed service chains. For example, the system can compare header information in the traffic (e.g., 5-tuple including source and destination information) with ACL entries programmed on the system for the respective service chains. Each ACL entry can specify a source (e.g., source IP or subnet), a destination (e.g., destination IP), a protocol, an application or service name, an action for redirecting the traffic to an associated service, etc. The system can thus use the header information in the traffic and the traffic information in the ACL entries to determine which, if any, ACL entries match the traffic and determine what action should be taken for the traffic.

When the traffic received has source information associated with the private network site (e.g., an IP or subnet associated with the private network site) and destination information matching the IP address in the respective IP-to-domain mapping associated with the respective cloud domain, the system can route the traffic through the respective service chain based on the one or more policies (e.g., ACL entries) associated with respective service chain. The system can redirect the traffic to each service in the respective service chain based on the programmed entries or policies for that service chain. Once the traffic has been processed through every service in the service chain, the system can send the traffic to the destination cloud domain.

Description of Example Embodiments

Disclosed herein are techniques for creating service chains for inter-cloud traffic. These techniques allow service chains to be configured based on both the origin cloud or network and the destination cloud or cloud service. The service chains can be configured on network devices for specific inter-cloud traffic using a reduced number of addresses for each cloud domain. As previously mentioned, cloud providers and services typically have a very large number of IP addresses allocated to them. Moreover, network devices have limited storage and memory resources, such as TCAM, which are insufficient to implement service chains for each IP allocated to a cloud provider or service. This problem is compounded when dealing with inter-cloud traffic, which typically involves an even higher number of IP addresses associated with the service chain. As a result, network devices generally do not have sufficient capacity to implement service chains for traffic between each origin and destination cloud IP. Consequently, network operators cannot program service chains on the network device based on the origin and destination clouds of inter-cloud traffic.

To overcome these limitations, the techniques herein can reduce the number of inter-cloud addresses used to program service chains for inter-cloud traffic on the network device. Each cloud domain can be mapped to a reduced number of addresses which can be used to program service chains on the network device for specific inter-cloud traffic without exceeding the hardware capabilities of the network device. The reduced number of addresses thus allows service chains to be programmed on the network device's hardware based on the origin and/or destination clouds or services of the inter-cloud traffic.

The service chains may be programmed on hardware access control lists (ACLs) on the network device. For example, the service chains can be programmed on ACLs in the network device's TCAM. The ACLs can include deterministic entries for each cloud domain and/or service, which define actions to be selectively applied to matching inter-cloud traffic. If the network device receives traffic matching an ACL entry, the network device can route the traffic to a particular service application in a service chain based on the action defined in the ACL entry. The ACL entries and reduced number of inter-cloud addresses allow service chains for inter-cloud traffic to be programmed directly on the network device, despite the limited hardware capabilities of the network device. The technologies herein also provide a paradigm for programming cloud service names used for the service chains natively on the network device.

The disclosure now turns to FIG. 1, which illustrates an example service chain configuration 100 for application traffic. In this example, a service chain 102 is configured to process traffic between endpoint 104 and endpoint 106. The endpoint 104 can include any device or server (physical and/or virtual) on a network, such as a cloud consumer network (e.g., a private cloud or on-premises site), and endpoint 106 can include any device or server (physical and/or virtual) on a different network, such as a public cloud. For example, endpoint 104 can be an application or server on a private cloud and endpoint 106 can be an application or server on a public cloud.

The service chain 102 includes service applications 112, 114, 116, which may be configured to apply specific L4 (Layer 4) through L7 (Layer 7) policies to traffic between endpoint 104 and endpoint 106. The service applications 112, 114, 116 can be implemented via respective virtual machines (VMs), software containers, servers, nodes, clusters of nodes, data centers, etc. Example service applications (112, 114, 116) include, without limitations, firewalls, Intrusion Detection Systems (IDS), Intrusion Prevention Systems (IPS), WAN Optimizers, Network Address Translation (NAT) systems, virtual routers/switches, load balancers, Virtual Private Network (VPN) gateways, data loss prevention (DLP) systems, web application firewalls (WAFs), application delivery controllers (ADCs), packet capture appliances, secure sockets layer (SSL) appliances, adaptive security appliances (ASAs), etc.

The service applications 112, 114, 116 in the service chain 102 are interconnected via a logical link 108A, which is supported by a physical link 108B through physical infrastructure 110. The physical infrastructure 110 can include one or more networks, nodes, data centers, clouds, hardware resources, physical locations, etc. Traffic from endpoint 104 can be routed to the physical infrastructure 110 through the physical link 108B, and redirected by the physical infrastructure 110 along the logical link 108A and through the service chain 102.

Figure 2A:
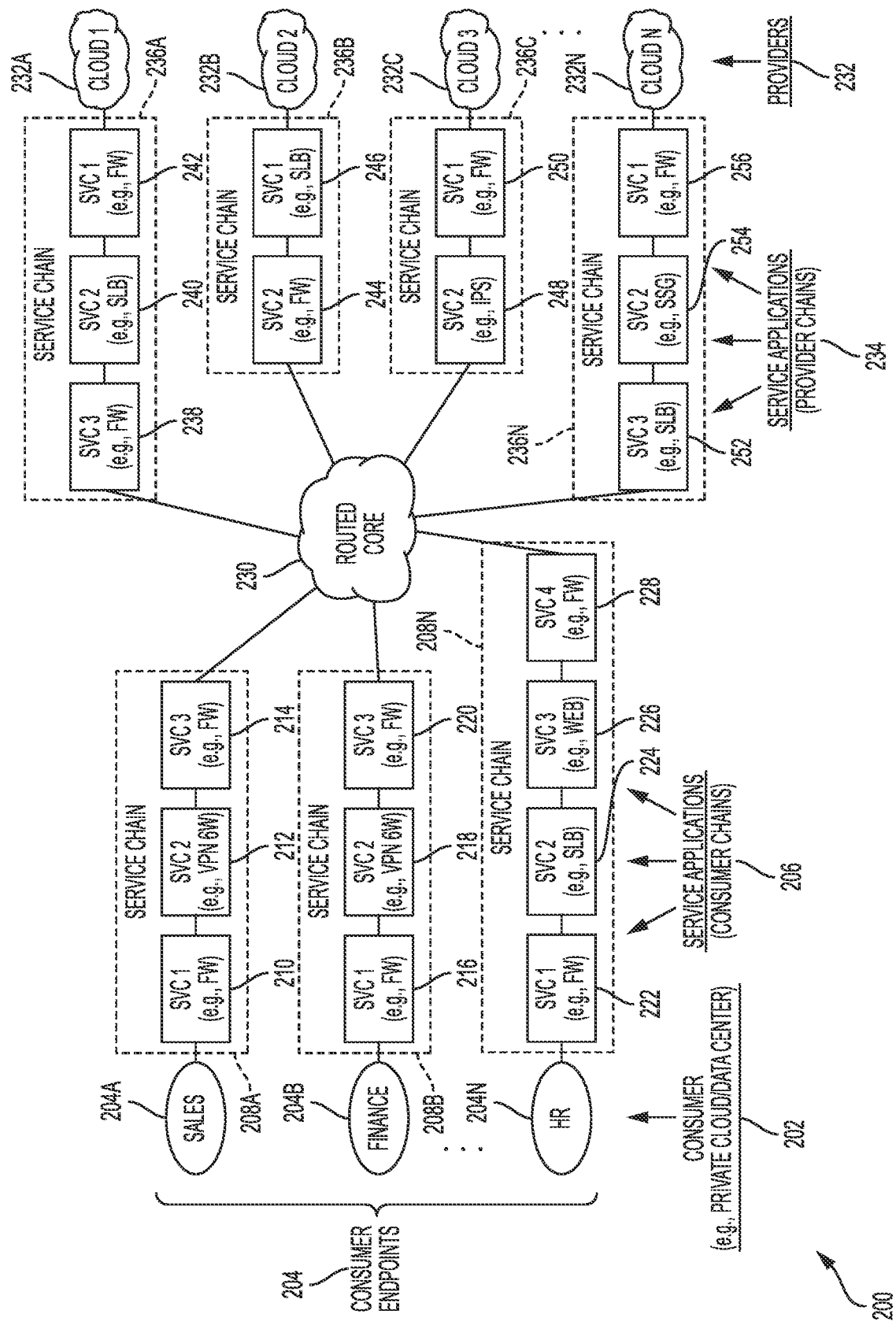
FIG. 2A illustrates a first example configuration of service chains for traffic between a cloud consumer and cloud providers.

FIG. 2A illustrates a first example configuration 200 of service chains 208A-N, 236A-N for traffic between a cloud consumer 202 and cloud providers 232. The consumer 202 represents a cloud customer or consumer network, such as a private cloud, network, data center, etc. The cloud providers 232 represent public clouds hosting applications, services, and/or resources consumed by the cloud consumer 202. The cloud consumer 202 and cloud providers 232 can communicate via routed core 230. Routed core 230 can represent one or more networks, clouds, data centers, routers, etc. For example, routed core 230 can represent an inter-cloud fabric capable of routing traffic between the cloud consumer 202 and the cloud providers 232.

The consumer 202 includes endpoints 204 which represent applications and/or servers hosted by the consumer 202 (e.g., on the consumer's network(s)). In this example, the endpoints 204 include sales applications 204A, finance applications 204B, and human resources (HR) applications 204N. The applications 204 can be hosted on specific servers and/or network segments of the consumer 202.

The configuration 200 includes consumer-side service chains 206 including service chains 208A-N (collectively "208") configured for traffic from the endpoints 204 to the cloud providers 232. The service chains 208 process traffic between the endpoints 204 and the routed core 230, prior to being routed by the routed core 230 to the cloud providers 232.

The service chains 208 include application services 210 configured to apply respective L4-L7 policies to traffic from the endpoints 204. For example, service chain 208A includes service applications 210, 212, 214 for traffic associated with the sales applications 204A. In this example, traffic from the sales applications 204A is first processed by service application 210 in the service chain 208A, which can be, for example, a perimeter firewall. The traffic is then processed by service application 212 in the service chain 208A, which can be, for example, a VPN gateway. The traffic is finally processed by service application 214 in the service chain 208A, which can be, for example, an application firewall (e.g., database firewall). Once the traffic is processed by service application 214, it is sent to the routed core 230, which subsequently routes the traffic to a particular cloud from the cloud providers 232.

Similarly, service chain 208B includes service applications 216, 218, 220 for traffic associated with the finance applications 204B. In this example, traffic from the finance applications 204B is first processed by service application 216 in the service chain 208B, which can be, for example, a perimeter firewall. The traffic is then processed by service application 218 in the service chain 208B, which can be, for example, a VPN gateway. The traffic is finally processed by service application 220 in the service chain 208A, which can be, for example, an application firewall. Once the traffic is processed by service application 220, it is sent to the routed core 230, which subsequently routes the traffic to a particular cloud from the cloud providers 232.

Service chain 208N includes service applications 222, 224, 226, 228 for traffic associated with the HR applications 204N. In this example, traffic from the HR applications 204N is first processed by service application 222 in the service chain 208N, which can be, for example, a perimeter firewall. The traffic is then processed by service application 218 in the service chain 208N, which can be, for example, a load balancer. The traffic is next processed by service application 226 in the service chain 208N, which can be, for example, a Web appliance. The traffic is finally processed by service application 228 in the service chain 208N, which can be, for example, an application firewall. Once the traffic is processed by service application 228, it is sent to the routed core 230, which subsequently routes the traffic to a particular cloud from the cloud providers 232.

As illustrated in FIG. 2A, the number, type and sequence of appliances in the service chains 208A-N can vary. Each service chain (208A-N) can be customized for the specific traffic associated with the applications 204A-N. Moreover, the service chains 208A-N can represent a logical path (e.g., 108A) for the traffic from the applications 204A-N, which can be supported by infrastructure (e.g., 110) along a physical path (e.g., 108B).

The configuration 200 also includes provider-side service chains 234 between the routed core 230 and the cloud providers 232. The provider-side service chains 234 can process traffic exchanged between the routed core 230 and the cloud providers 232. The provider-side service chains 234 in this example include service chains 236 A-N (collectively "236"). Each of the service chains 236 corresponds to a particular cloud 232A-N.

For example, service chain 236A corresponds to cloud 232A, and includes service applications 238, 240, 242. Service applications 238, 240, 242 process traffic between the routed core 230 and cloud 232A. In this example, service applications 238, 240, 242 represent a perimeter firewall, a load balancer, and an application firewall (e.g., database firewall, Web firewall, etc.).

Service chain 236B corresponds to cloud 232B, and includes service applications 244 and 246. Service applications 244 and 246 process traffic between the routed core 230 and cloud 232B. In this example, service applications 244 and 246 represent a firewall and a load balancer.

Service chain 236C corresponds to cloud 232C, and includes service applications 248 and 250. Service applications 248 and 250 process traffic between the routed core 230 and cloud 232C. In this example, service applications 248 and 250 represent an IPS and a firewall.

Service chain 236N corresponds to cloud 232N, and includes service applications 252, 254, 256. Service applications 252, 254, 256 process traffic between the routed core 230 and cloud 232N. In this example, service applications 252, 254, 256 represent a perimeter firewall, an SSL appliance, and a load balancer.

Figure 2B:
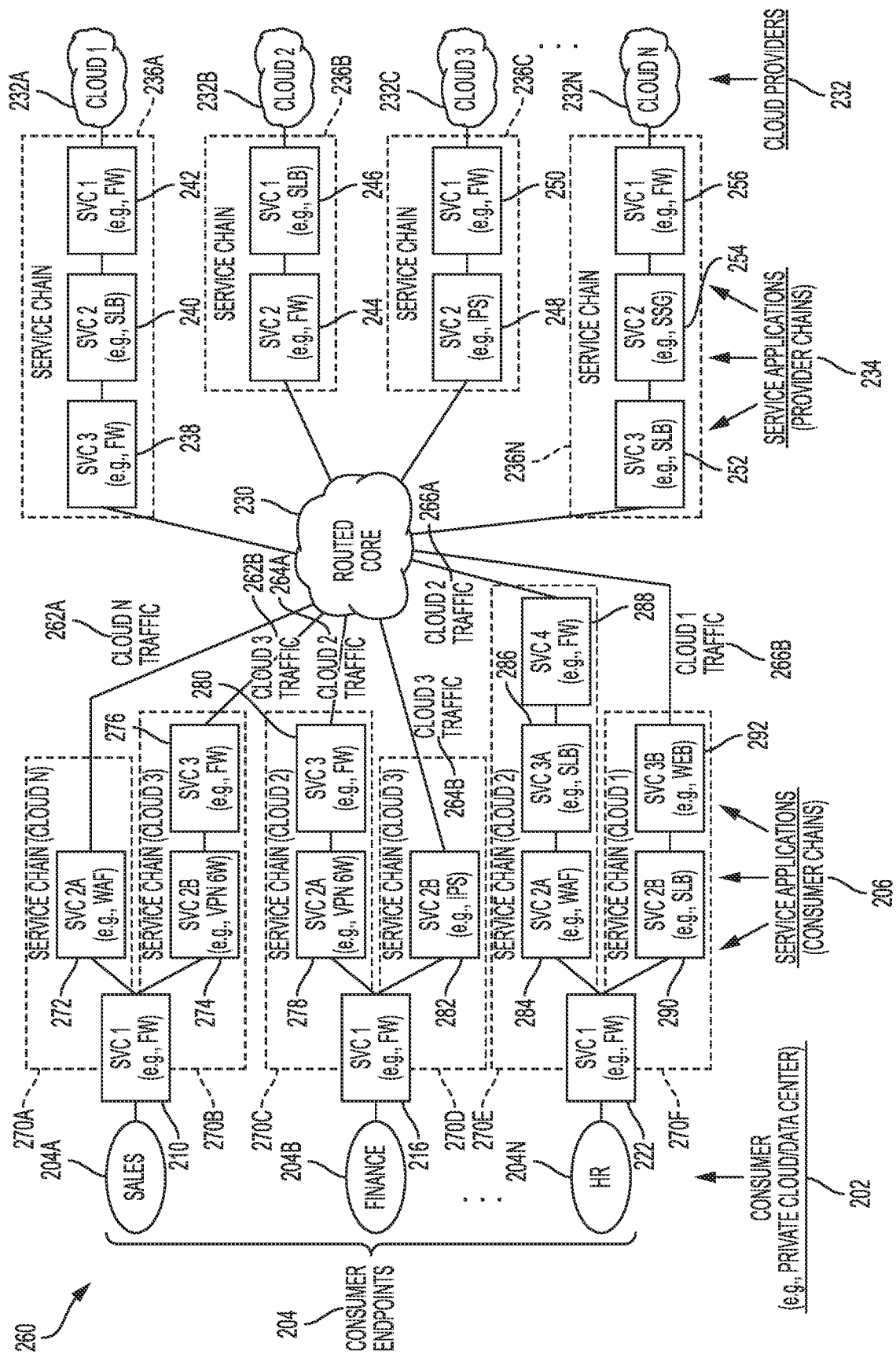
FIG. 2B illustrates a second example configuration of service chains for traffic between a cloud consumer and cloud providers, including different consumer-side service chains configured based on the respective origin and destination of the traffic.

FIG. 2B illustrates another example configuration 260 of service chains for traffic between cloud consumer 202 and cloud providers 232. In this example, configuration 260 includes different consumer-side service chains 270 configured based on the respective origin (e.g., applications 204A-N on the consumer 202) and destination cloud (e.g., 232A-N) of the traffic. Unlike configuration 200 shown in FIG. 2A, which applies the same service chains to all traffic of a particular consumer endpoint (e.g., applications 204A-N) irrespective of the cloud destination (e.g., 232A-N), configuration 260 can apply different service chains to traffic from the same consumer endpoint depending on the cloud destination associated with the traffic.

The consumer-side service chains 270 in configuration 260 are deterministically applied to traffic based on a match of the traffic origin (e.g., application 204A, 204B, or 204N) and the traffic destination (e.g., cloud 232A, 232B, 232C, or 232N). The different consumer-side service chains 270 are thus configured specifically based on the respective traffic origin at the consumer 202 and destination clouds. The different consumer-side service chains 270 can be programmed on hardware (e.g., TCAM) as described herein, despite the large number of addresses allocated to the consumer 202 and each of the cloud providers 232.

To illustrate, service chain 270A is configured specifically for traffic 262A between sales applications 204A and cloud 232N. In this example, service chain 270A includes service application 210 (e.g., perimeter firewall) and service application 272 (e.g., web application firewall (WAF)). Service chain 270B is configured specifically for traffic 262B between the sales applications 204A and cloud 232C. In this example, service chain 270B includes service application 210 (e.g., perimeter firewall), service application 274 (e.g., VPN gateway), and service application 276 (e.g., application firewall). As illustrated by service chains 270A and 270B, traffic associated with the sales applications 204A can be routed through different service chains depending on the destination cloud associated with the traffic.

Service chain 270C is configured specifically for traffic 264A between finance applications 204B and cloud 232B. In this example, service chain 270C includes service application 216 (e.g., perimeter firewall), service application 278 (e.g., VPN gateway), and service application 280 (e.g., application firewall). Service chain 270D is configured specifically for traffic 264B between the finance applications 204B and cloud 232C. In this example, service chain 270D includes service application 216 (e.g., perimeter firewall) and service application 282 (e.g., IPS).

Service chain 270E is configured specifically for traffic 266A between HR applications 204N and cloud 232B. In this example, service chain 270E includes service application 222 (e.g., perimeter firewall), service application 284 (e.g., WAF), service application 286 (e.g., load balancer), and service application 288 (e.g., application firewall). Service chain 270F is configured specifically for traffic 266B between the HR applications 204N and cloud 232A. In this example, service chain 270F includes service application 222 (e.g., perimeter firewall), service application 290 (e.g., load balancer), and service application 292 (e.g., Web appliance).

As illustrated in FIG. 2B, the number, type and sequence of appliances in the consumer-side service chains 270 can vary. Each service chain (270A-F) can be customized based on the traffic origin (e.g., applications 204A-N at the consumer 202) and the traffic destination (e.g., clouds 232A-N). Moreover, the consumer-side service chains 270 can represent a logical path (e.g., 108A) for the traffic from the applications 204A-N, which can be supported by infrastructure (e.g., 110) along a physical path (e.g., 108B).

Figure 3:
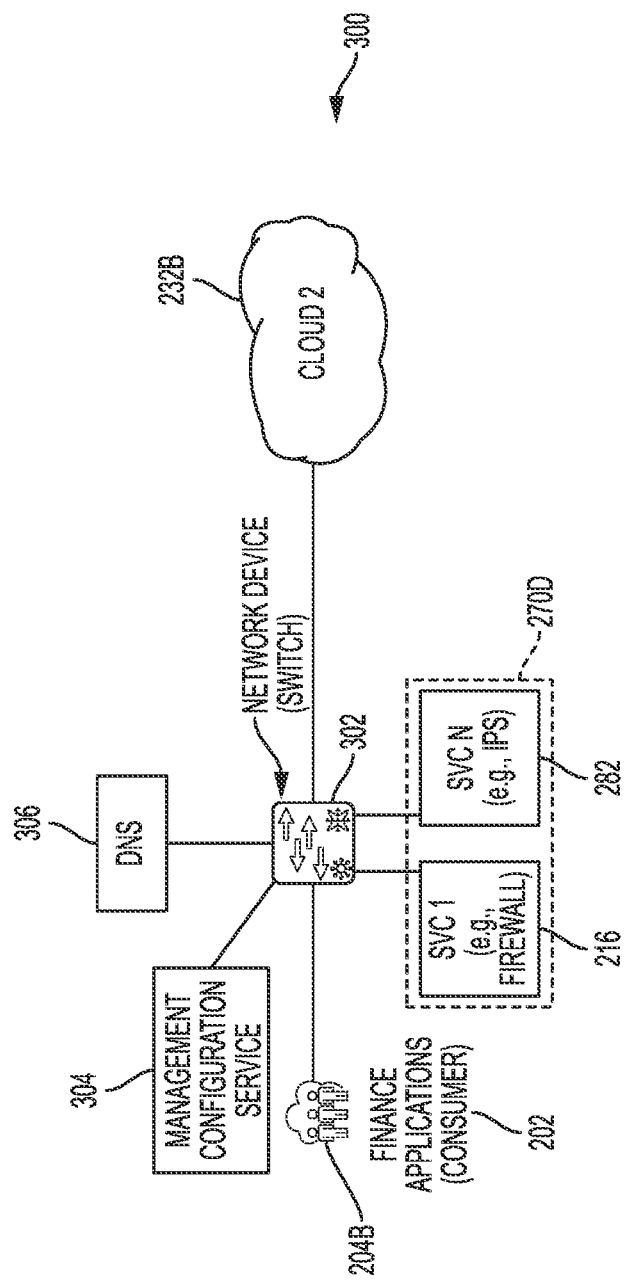
FIG. 3 illustrates a diagram of an example architecture for configuring a network device to perform service chaining for inter-cloud traffic.

FIG. 3 illustrates a diagram of an example architecture 300 for configuring a network device to perform service chaining for inter-cloud traffic. The architecture 300 includes a network device 302, such as a switch, for routing inter-cloud traffic through specific service chains configured and applied based on the traffic origin (e.g., consumer 202) and the traffic destination cloud (e.g., cloud providers 232). In this example, network device 302 is programmed to route traffic between finance applications 204B and cloud 232B through service chain 270D, which includes service applications 216, 282. The service chain 270D can be programmed on hardware of the network device 302. For example, the service chain 270D can be programmed on an ACL in TCAM on the network device 302.

To program the service chain 270D, a management configuration service 304 can communicate with the network device 302 to specify the service chain(s) (e.g., 270D) and endpoints (e.g., 204B and 232B) for the service chain(s). The service chain(s) and endpoint can be defined by the consumer 202. Moreover, the endpoints can reside in different clouds. The network device 302 can then build the service chain(s) to ensure that traffic between specific consumer segments (e.g., endpoints 204) and cloud services (e.g., clouds 232A-N) are redirected to respective L4-L7 service chains.

In some cases, the consumer 202 can access an interface via the management configuration service 304 where the consumer 202 can specify the destination domains (e.g., clouds 232A-N) corresponding to the service chains they want to create for specific application traffic. The consumer 202 can also specify the consumer applications or endpoints associated with the service chains. The consumer applications or endpoints (e.g., applications 204A-N) can be identified based on respective network addressing information. For example, the consumer applications or endpoints can be identified by their corresponding IP subnets.

In this example, the consumer 202 specifies service chain 270D, which includes service applications 216 and 282, and identifies finance applications 204B and cloud 232B for the service chain 270D. The network device 302 will then create, as described below, the service chain 270D and deterministically apply it to traffic between the finance applications 204B and cloud 232B.

The network device 302 can be configured to communicate with DNS server 306 to forward DNS queries from the consumer 202. In some examples, the DNS server 306 can be an OPEN DNS server. When the network device 302 receives a DNS request from the finance applications 204B, it can forward the DNS request to the DNS server 306. The DNS request can identify the domain name of the cloud 232B (and/or a cloud service associated with the cloud 232B), and request an IP address to communicate with the cloud 232B. The DNS server 306 identifies an IP address allocated to the cloud 232B and returns a DNS resolution response identifying the IP address associated with the domain name.

The network device 302 then receives the DNS resolution response from the DNS server 306. The network device 302 can snoop the DNS request and the DNS resolution response to build a cache of domain-to-IP mappings for the cloud 232B. To reduce the number of hardware entries or policies (e.g., TCAM entries) needed to program the service chain 270D on the network device 302, the network device 302 can use a subset of IP addresses for the cloud 232B, rather than creating an entry for each IP of the cloud 232B. As previously explained, the number of IP addresses allocated to the cloud 232B can be very large. Therefore, programming an entry on the network device 302 for each IP of the cloud 232B can be expensive and even prohibitive. Accordingly, the network device 302 can scale the service chaining to a smaller subset of IP addresses.

The subset of IP addresses can include one or more IP addresses allocated to the cloud 232B and identified by snooping the DNS requests from the consumer 202, or a single virtual IP (VIP). For example, in some implementations, the network device 302 can allocate a VIP for each cloud and use the VIP to program hardware entries for the respective service chains. The network device 302 can then match traffic from the consumer 202 to a specific service chain based on the traffic source (e.g., IP or subnet associated with the consumer 202 or consumer endpoint 204) and the VIP allocated to the destination cloud. The network device 302 can redirect the traffic to the service applications associated with the specific service chain and perform a destination network address translation (NAT) to then route the traffic to the destination cloud.

To illustrate, the network device 302 can allocate a VIP to cloud 232B and use the VIP and an address associated with the finance applications 204B, such as a subnet IP, to program TCAM entries for the service chain 270D. The network device can then use the addresses used to program the service chain 270D; namely, the VIP associated with the cloud 232B and the address associated with the finance applications 204B, to match traffic between the finance applications 204B and the cloud 232B with the TCAM entries associated with the service chain 270D and redirect the traffic accordingly.

In other implementations, the network device 302 can spoof the DNS entries associated with the destination cloud (e.g., 232B) and use a small subset of IP addresses allocated to the destination cloud (e.g., 232B) to program the hardware entries (e.g., TCAM entries) for the respective service chain (e.g., 270D). The subset of IP addresses can be determined by snooping the DNS requests as previously mentioned. The network device 302 can then use the subset of IP addresses to match traffic from the consumer 202 (e.g., finance applications 204B) to the destination cloud (e.g., 232B) with the hardware entries for the respective service chain (e.g., 270D) and redirect the traffic accordingly. Once the traffic is processed through the service chain, the network device 302 can route the traffic to the destination cloud (232B). In this example, NAT is not required to route the traffic to the destination cloud. Instead, the network device 302 can route the traffic to the destination cloud using the destination IP address associated with the traffic and the respective hardware entries.

Having programmed the service chain 270D on hardware based on the subset of IP addresses selected for the cloud 232B (e.g., the VIP assigned by the network device 302 to the cloud 232B or the subset of IP addresses allocated to the cloud 232B and identified based on DNS resolution results), the network device 302 can deterministically redirect traffic between the finance applications 204B and destination cloud 232B to the service chain 270D.

For example, when the network device 302 receives traffic from the finance applications 204B, it can perform a TCAM or hardware lookup using the source and destination address information in the packets. Based on the TCAM or hardware lookup, the network device 302 can find entries matching the source and destination address information in the packets, and redirect the packets through the service chain 270D as specified by the matching entries associated with the service chain 270D. After the packets are processed through the service chain 270D, the network device 302 can send the packets to the destination cloud 232B.

Figure 4:
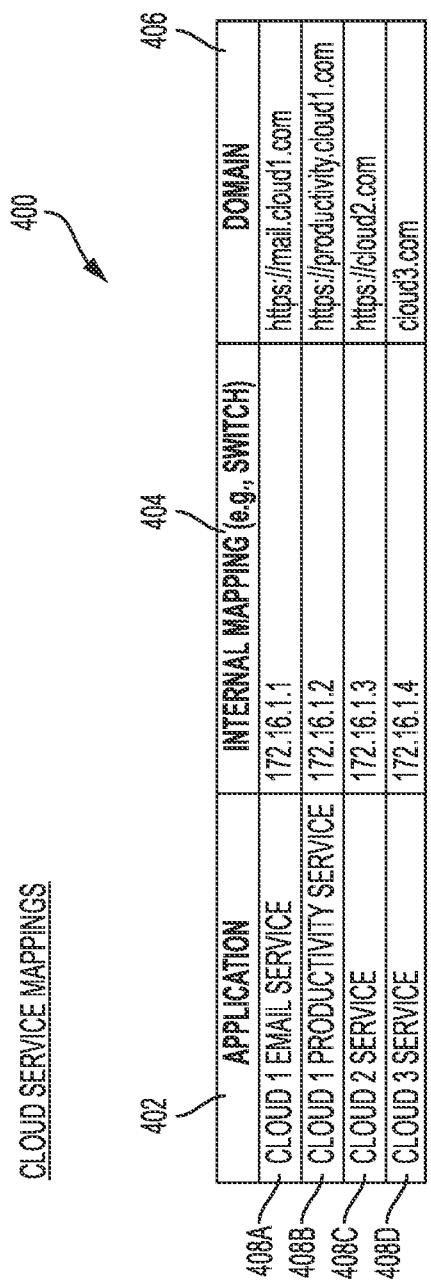
FIG. 4 illustrates example IP-to-domain mappings for programming service chains for inter-cloud traffic.

FIG. 4 illustrates example IP-to-domain mappings 400 for programming service chains for inter-cloud traffic. The IP-to-domain mappings 400 can map cloud application names 402 to internal IP mappings 404 and domain names 406. The cloud application names 402 can correspond to respective cloud services associated with the cloud providers 232 and the domain names 406 can correspond to the respective cloud services and cloud providers 232. The internal IP mappings 404 can include the subset of IP addresses allocated by the network device 302 to the domain names 406. For example, the internal IP mappings 404 can include respective VIPs or spoofed DNS entries for the domain names 406 (e.g., the subset of IP address associated with the clouds 232A-N).

To illustrate, in FIG. 4, the IP-to-domain mappings 400 include entries 408A-D for clouds 232A, 232B, and 232C. Entry 408A maps Cloud 1 (232A) Email Service to private IP 172.16.1.1 and domain name http://mail.cloud1.com. Entry 408B maps Cloud 1 (232A) Productivity Service to private IP 172.16.1.2 and domain name http://productivity.cloud1.com. Entry 408C maps Cloud 2 (232B) Service to private IP 172.16.1.3 and domain name http://cloud2.com. Entry 408D maps Cloud 3 (232C) Service to private IP 172.16.1.4 and domain name cloud3.com. Entries 408A-D in the IP-to-domain mappings 400 can then be used to program service chains for inter-cloud traffic, as illustrated in FIG. 5.

Figure 5:
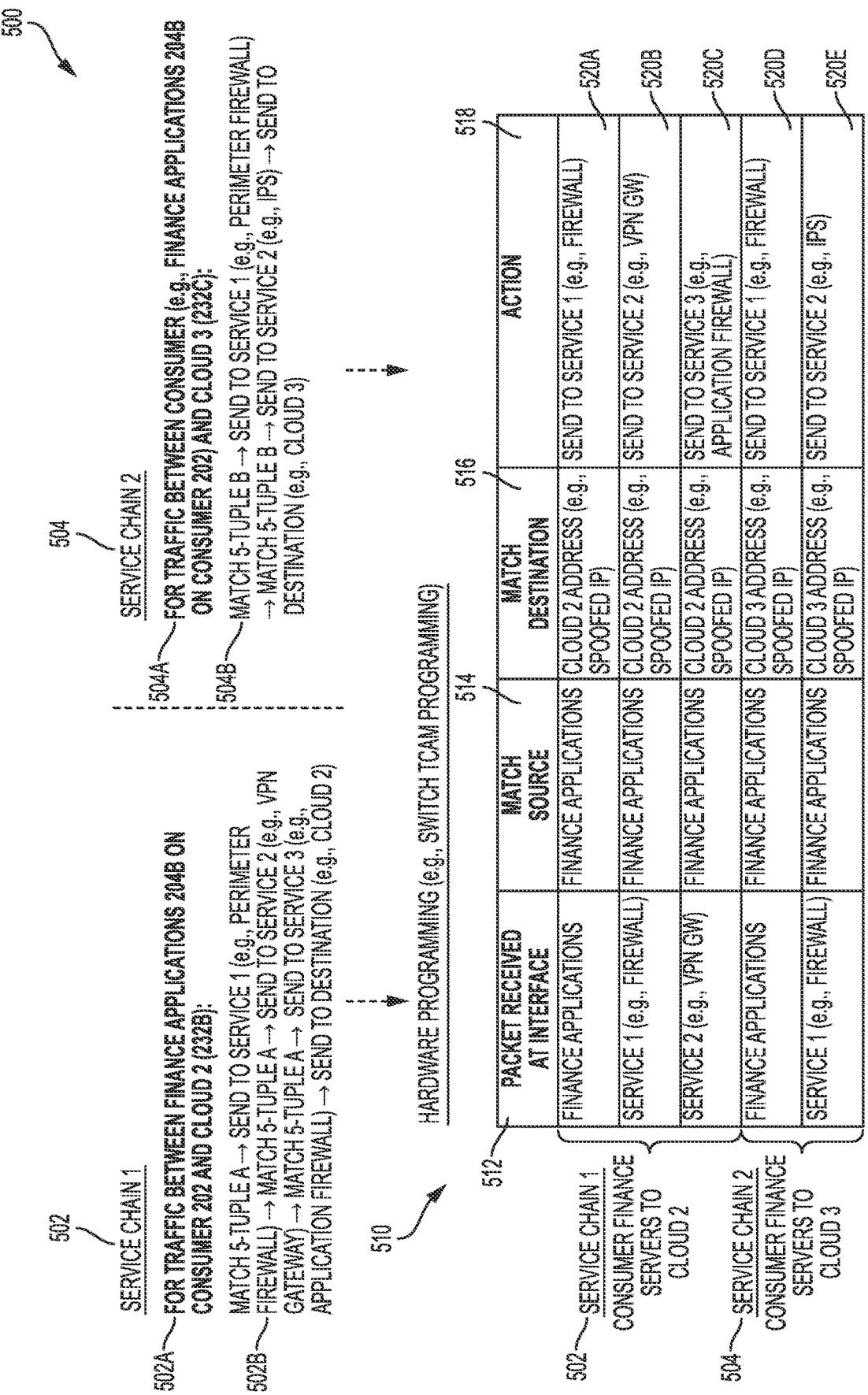
FIG. 5 illustrates example service chain definitions for inter-cloud traffic and hardware ACL entries programmed on a network device to build service chains according to the service chain definitions.

FIG. 5 illustrates example service chain definitions 500 for inter-cloud traffic and hardware ACL 510 programmed on network device 302 to build service chains according to the service chain definitions 500. The service chain definitions 500 identify service chains 502, 504 defined for specific inter-cloud traffic.

Service chain 502 includes an indication 502A of the traffic associated with the service chain 502. The indication 502A specifies that the service chain 502 corresponds to traffic between finance applications 204B associated with consumer 202 and cloud 232B (e.g., Cloud 2). The service chain 502 also includes rules 502B for building the service chain 502.

The rules 502B identify actions to be performed for traffic matching 5-tuple A associated with the finance applications 204B and cloud 232B. The 5-tuple A can include the origin IP/subnet of the traffic, the origin port number of the traffic, the destination IP of the traffic, the destination port of the traffic, and the application service or protocol associated with the traffic. In this example, the 5-tuple A includes the IP or IP subnet associated with the finance applications 204B as the source and the IP allocated by the network device 302 to the cloud 232B (e.g., IP 172.16.1.3 from entry 408C in the internal IP mapping 404 shown in FIG. 4) as the destination.

In this example, the rules 502B indicate that traffic matching 5-tuple A associated with the finance applications 204B and cloud 2 (232B) should first be sent to Service 1 (e.g., 216), which in this example is a perimeter firewall. The rules 502B further indicate that traffic matching 5-tuple A should then be sent to Service 2 (e.g., 278), which in this example is a VPN gateway. The rules 502B indicate that traffic matching 5-tuple A should next be sent to Service 3 (e.g., 280), which in this example is an application firewall. The rules 502B finally indicate that after being processed by Service 3 (e.g., 280), the traffic matching 5-tuple A should be sent to the destination (e.g., cloud 232B).

Service chain 504 includes an indication 504A of the traffic associated with the service chain 504. The indication 504A specifies that the service chain 504 corresponds to traffic between finance applications 204B associated with consumer 202 and cloud 232C (e.g., Cloud 3). The service chain 504 also includes rules 504B for building the service chain 504.

The rules 504B identify actions to be performed for traffic matching 5-tuple B associated with the finance applications 204B and cloud 232C (e.g., Cloud 3). The 5-tuple B can include the origin IP/subnet of the traffic, the origin port number of the traffic, the destination IP of the traffic, the destination port of the traffic, and the application service or protocol associated with the traffic. In this example, the 5-tuple B includes the IP or IP subnet associated with the finance applications 204B as the source and the IP allocated by the network device 302 to the cloud 232C (e.g., IP 172.16.1.4 from entry 408D in the internal IP mapping 404 shown in FIG. 4) as the destination.

In this example, the rules 504B indicate that traffic matching 5-tuple B associated with the finance applications 204B and cloud 3 (232C) should first be sent to Service 1 (e.g., 216), which in this example is a perimeter firewall. The rules 504B further indicate that traffic matching 5-tuple B should then be sent to Service 2 (e.g., 282), which in this example is an IPS. The rules 504B finally indicate that after being processed by Service 2 (e.g., 282), the traffic matching 5-tuple B should be sent to the destination (e.g., cloud 232C).

Hardware ACL 510 (e.g., TCAM ACL) can be programmed on network device 302 consistent with the service chain definitions 500 to build the service chains 502, 504 on the network device 302. In this example, the hardware ACL 510 includes an interface field 512 which defines the interface associated with the received packets, a match source field 514 which defines the source of the packet associated with the ACL entries (e.g., 520A-E), a match destination field 516 which defines the destination of the packet associated with the ACL entries (e.g., 520A-E), and an action field 518 which defines the respective actions for each ACL entries (e.g., 520A-E).

The hardware ACL 510 includes ACL entries 520A-E programmed on the network device 302 to build the service chains 502, 504. Entries 520A, 520B, and 520C pertain to service chain 502, and entries 520D and 520E pertain to service chain 504.

In this example, entry 520A identifies the finance applications 204B in the interface field 512. Entry 520A identifies the finance applications 204B as the source of the packets in source field 514, and the cloud 2 (e.g., 232B) IP address (e.g., IP 172.16.1.3 from entry 408C in the internal IP mapping 404 shown in FIG. 4) as the destination of the packets in destination field 516. In the action field 518, entry 520A indicates that packets matching the interface field 512 (e.g., finance applications 204B), the source field 514 (e.g., finance applications 204B), and the destination field 516 (e.g., cloud 232B) should be sent to Service 1 (216), which in this example is a perimeter firewall.

Entry 520B defines the next the action in the service chain 502 for processing the packets after the packets pass through the Service 1 (216). Entry 520B identifies Service 1 (216) in the interface field 512, the finance applications 204B as the source of the packets in source field 514, and the cloud 2 (e.g., 232B) IP address (e.g., IP 172.16.1.3 from entry 408C in the internal IP mapping 404 shown in FIG. 4) as the destination of the packets in destination field 516. In the action field 518, entry 520B indicates that packets matching the interface field 512 (e.g., Service 216), the source field 514 (e.g., finance applications 204B), and the destination field 516 (e.g., cloud 232B) should be sent to Service 2 (278), which in this example is the VPN gateway.

Finally, entry 520C defines the next the action in the service chain 502 for processing the packets after the packets pass through the Service 2 (278). Entry 520C identifies Service 2 (278) in the interface field 512, the finance applications 204B as the source of the packets in source field 514, and the cloud 2 (e.g., 232B) IP address (e.g., IP 172.16.1.3 from entry 408C in the internal IP mapping 404 shown in FIG. 4) as the destination of the packets in destination field 516. In the action field 518, entry 520C indicates that packets matching the interface field 512 (e.g., Service 278), the source field 514 (e.g., finance applications 204B), and the destination field 516 (e.g., cloud 232B) should be sent to Service 3 (280), which in this example is the application firewall.

As illustrated above, entries 520A-C provide the rules for routing traffic from the finance applications 204B to the cloud 2 (232B) through the service chain 502, as reflected in the service chain definitions 500. Packets matching the entries 520A-C will be routed through each service in the service chain 502 based on the respective actions in the actions field 518. Once the packets are processed through the service chain 502, the network device 302 can send the packets to the destination (e.g., cloud 232B).

As previously mentioned, entries 520D and 520E correspond to service chain 504. Entry 520D identifies the finance applications 204B in the interface field 512. Entry 520D identifies the finance applications 204B as the source of packets in source field 514, and the cloud 3 (e.g., 232C) IP address (e.g., IP 172.16.1.4 from entry 408D in the internal IP mapping 404 shown in FIG. 4) as the destination of the packets in destination field 516. In the action field 518, entry 520D indicates that packets matching the interface field 512 (e.g., finance applications 204B), the source field 514 (e.g., finance applications 204B), and the destination field 516 (e.g., cloud 232C) should be sent to Service 1 (216), which in this example is the perimeter firewall.

Entry 520E defines the next the action in the service chain 504 for processing the packets after the packets pass through the Service 1 (216). Entry 520E identifies Service 1 (216) in the interface field 512, the finance applications 204B as the source of the packets in source field 514, and the cloud 3 (e.g., 232C) IP address (e.g., IP 172.16.1.4 from entry 408D in the internal IP mapping 404 shown in FIG. 4) as the destination of the packets in destination field 516. In the action field 518, entry 520E indicates that packets matching the interface field 512 (e.g., Service 216), the source field 514 (e.g., finance applications 204B), and the destination field 516 (e.g., cloud 232C) should be sent to Service 2 (282), which in this example is the IPS.

As illustrated here, entries 520D-E provide the rules for routing traffic from the finance applications 204B to the cloud 3 (232C) through the service chain 504, as reflected in the service chain definitions 500. Packets matching the entries 520D-E will be routed through each service in the service chain 504 based on the respective actions in the actions field 518. Once the packets are processed through the service chain 504, the network device 302 can send the packets to the destination (e.g., cloud 232C).

The entries 520A-E in the hardware ACL 510 thus allow traffic from the same source cloud or network segment (e.g., finance applications 204B and/or consumer 202) to be processed through different service chains depending on the destination cloud of the traffic (e.g., cloud 232B or cloud 232C). The destination information in the destination field 516 of the hardware ACL 510 can include a respective subset of IP addresses allocated for each of the different clouds, such as a single VIP or a spoofed IP address associated with each cloud destination, as previously explained. This enables customized service chains to be programmed on hardware of the network device 302 (e.g., TCAM) for inter-cloud traffic based on both the origin cloud or network and the destination cloud, without requiring a prohibitive number of entries to accommodate every IP allocated to the source and/or the destination cloud.

Figure 6:
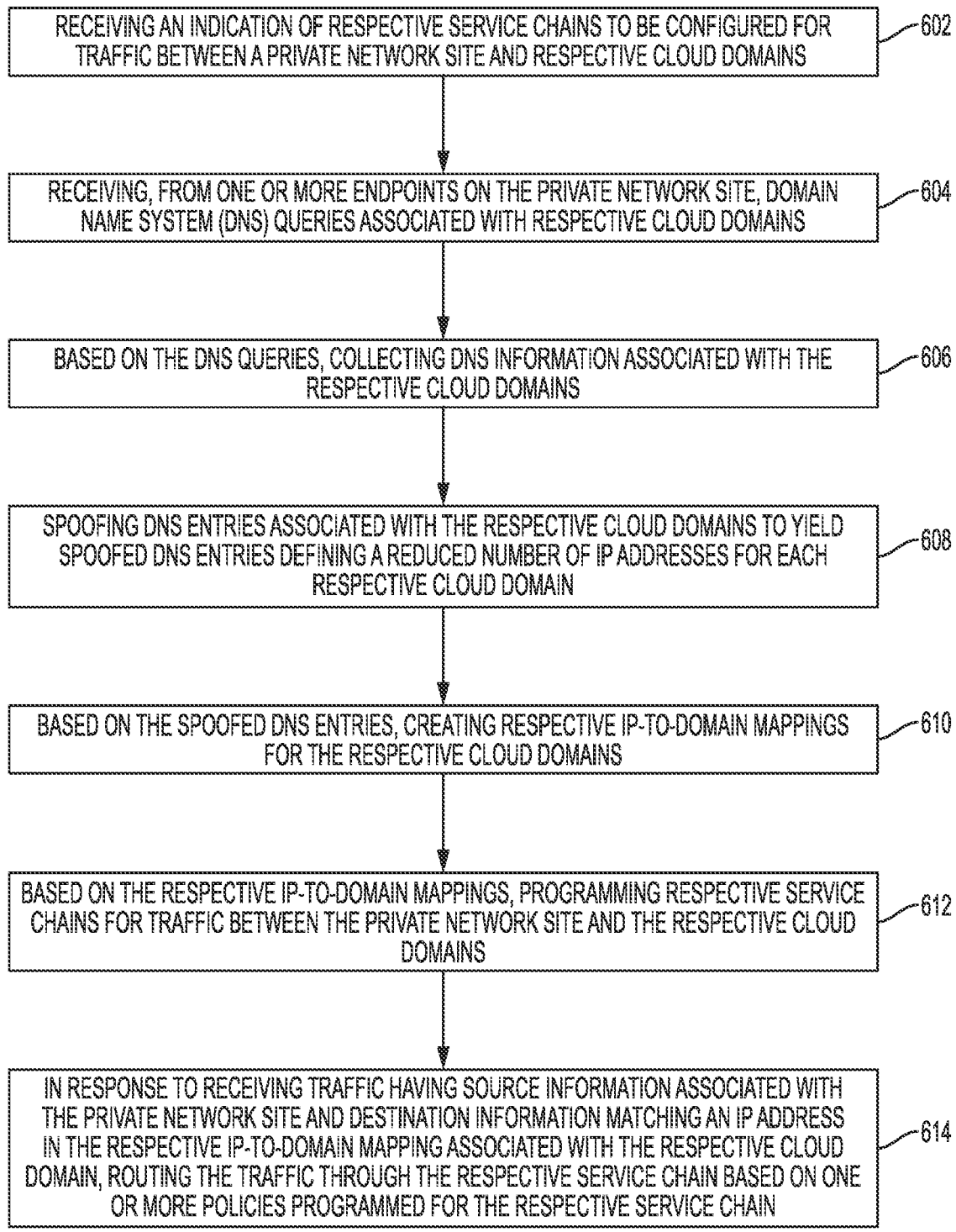
FIG. 6 illustrates an example method for creating service chains for inter-cloud traffic.

Having disclosed various system components and concepts, the disclosure now turns to the example method for building service chains for inter-cloud traffic, as shown in FIG. 6. For the sake of clarity, the method is described in terms of the network device 302 and architecture 300, as shown in FIG. 3. The steps outlined herein are non-limiting examples provided for illustration purposes, and can be implemented in any combination thereof, including combinations that exclude, add, or modify certain steps.

FIG. 6 illustrates an example method for building service chains for inter-cloud traffic. At step 602, the network device 302 can receive an indication of respective service chains (e.g., 270) to be configured for traffic between a private network site (e.g., consumer 202) and respective cloud domains (e.g., clouds 323A-N). The indication can be configured by a client (e.g., consumer 202) via the network device 302 or a management service (e.g., 304). The indication can specify a respective sequence of services or appliances (e.g., L4-L7 appliances) for the respective service chains as well as specific cloud endpoints, services, or domains associated with the respective service chains. The indication can specify that traffic to the specific cloud endpoints, services or domains should be redirected and routed through the respective sequence of services or appliances in the respective service chains.

At step 604, the network device 302 can receive, from one or more endpoints (e.g., consumer endpoints 204) on the private network site, name system (DNS) queries associated with the respective cloud domains (e.g., clouds 323A-N). At step 606, based on the DNS queries, the network device 302 can collect DNS information associated with the respective cloud domains. For example, the network device 302 can forward the DNS queries to a DNS server (e.g., 306) and snoop the DNS queries and/or DNS resolution results received from the DNS server to identify the DNS information associated with the respective cloud domains. The DNS information can include an IP address registered to a respective cloud domain.

At step 608, the network device 302 can spoof DNS entries associated with the respective cloud domains to yield spoofed DNS entries. The spoofed DNS entries can define a reduced number of IP addresses for each respective cloud domain. The reduced number of IP addresses will be less than a total number of IP addresses registered to the respective cloud domain. In some cases, the reduced number of IP addresses can be a virtual or private IP address spoofed or allocated by the network device 302 to the respective cloud domain. In other cases, the reduced number of IP addresses can be a subset of the IP addresses registered to the respective cloud domain. The subset of the IP addresses can be identified based on the DNS queries. For example, the subset of the IP addresses can be identified by snooping the DNS queries and/or DNS resolution results from the DNS server.

The network device 302 can send to the one or more endpoints in the private network site a DNS response to the DNS queries. In the DNS response, the network device 302 can provide DNS information associated with the respective cloud domains. The DNS information in the DNS response can include the reduced number of IP addresses for each respective cloud domain. The one or more endpoints can use the DNS information in the DNS response to send data traffic to the respective cloud domains.

At step 610, based on the spoofed DNS entries, the network device 302 can create respective IP-to-domain mappings for the respective cloud domains. Each respective IP-to-domain mapping can associate the respective cloud domain with an IP address from the reduced number of IP addresses associated with the respective cloud domain. For example, the respective IP-to-domain mapping can associate the respective cloud domain with a virtual or private IP allocated by the network device 302 to the respective cloud domain, or a subset of IP addresses associated with the respective cloud domain and identified by snooping the DNS queries and/or resolution results from the DNS server.

At step 612, based on the respective IP-to-domain mappings, the network device 302 can program the respective service chains for traffic between the private network site and the respective cloud domains. Each respective service chain can be programmed via one or more policies configured to route, through the respective service chain, traffic having source information associated with the private network site (e.g., an IP or subnet associated with the one or more endpoints in the private network site) and destination information matching the IP address in the respective IP-to-domain mapping associated with the respective cloud domain.

In some cases, the one or more policies can be ACL entries programmed on hardware of the network device 302, such as TCAM on the network device 302. The ACL entries can specify a traffic source (e.g., an IP or subnet associated with the one or more endpoints) and destination (e.g., the IP(s) assigned to clouds 232A, 232B, 232C, and/or 232N) used to recognize when specific traffic should be routed through the respective service chain. Each ACL entry can also specify an action which identifies a routing target for traffic matching the traffic source and destination specified in the ACL entry. The routing target can be a specific service in the service chain or, if the ACL entry specifies an action to be performed after the traffic has been routed through the service chain, the routing target can be the respective cloud domain.

At step 614, in response to receiving traffic (e.g., 262A-B, 264A-B, 266A-B) having source information associated with the private network site (e.g., a source IP or subnet associated with the one or more endpoints) and destination information matching the IP address in the respective IP-to-domain mapping associated with the respective cloud domain (e.g., clouds 232A, 232B, 232C, and/or 232N), the network device 302 can route the traffic through the respective service chain based on the one or more policies (e.g., ACL entries) associated with the respective service chain.

For example, the network device 302 can receive data traffic from an endpoint (e.g., 204A) on the private network site (e.g., 202), and perform a lookup on the network device 302 (e.g., a TCAM lookup) to determine if the data traffic matches any entries on the network device 302 (e.g., ACL entries 520A-E). The network device 302 can compare header information (e.g., a 5-tuple including the source and destination addresses) in the packets of the data traffic with the information in the entries (e.g., a respective interface, source, destination, protocol, etc., specified in the entries) and identify any matching entries that may exist. If the network device 302 identifies a matching entry, the network device 302 performs an action (e.g., 518) specified in the matching entry. The action can instruct the network device 302 to redirect the packets to a specific service in the service chain associated with the matching entry. The network device 302 then redirects the packets to the specific service as specified in the action defined on the matching entry for processing by the specific service.

Once the specific service has processed the packets, the network device 302 can route the packets to the next service in the service chain based on a second matching entry associated with the service chain. When the next service has completed processing the packets, the network device 302 can continue routing the packets to each service in the service chain as defined by any remaining entries for that service chain. Once the packets have been processed through all the services in the service chains, the network device 302 can send the packets to the destination cloud domain (e.g., clouds 232A, 232B, 232C, or 232N).

In this way, the network device 302 can program and apply service chains for traffic based on the source cloud or network and the destination cloud, without having to create a prohibitively large number of ACL entries for each IP address registered or used by the source cloud or network and the destination cloud. Thus, while public clouds may have thousands of registered/allocated IPs, the network device 302 can implement service chains customized for different private cloud and public cloud combinations using a single IP for each public cloud or a small subset of IPs for each public cloud. To further limit the number of IP addresses needed to configure the service chains, the network device 302 can also use subnets or other segment identifiers to identify the private cloud/data center for use in programming and applying service chains for traffic from the private cloud/data center.

Figure 7:
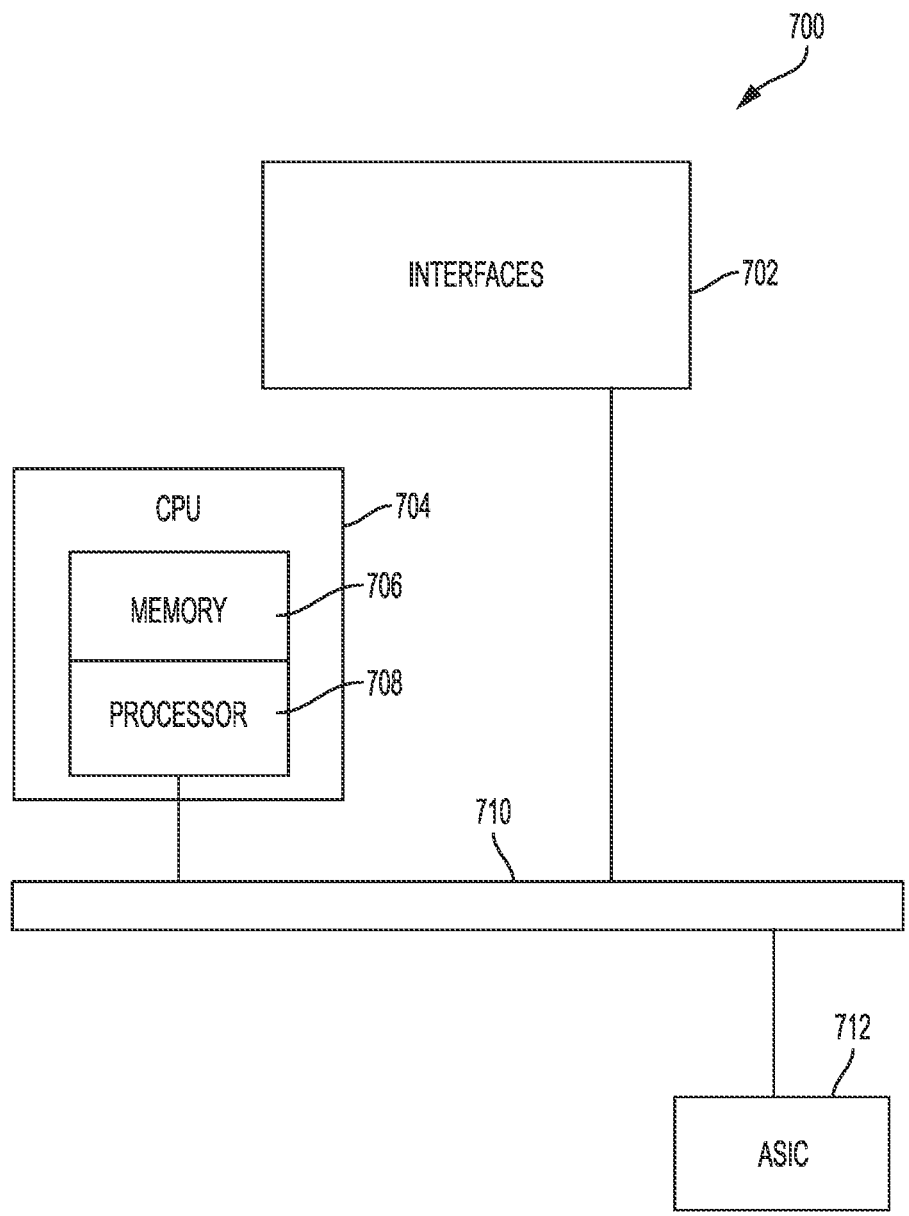
FIG. 7 illustrates an example network device for programming and applying service chains for inter-cloud traffic.
Figure 8:
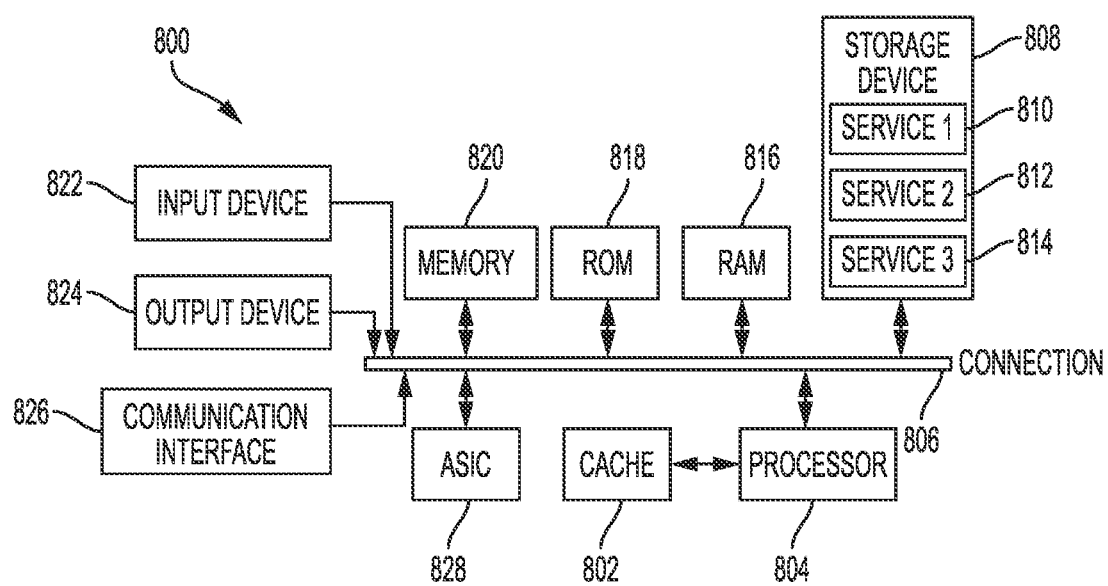
FIG. 8 illustrates an example computing device architecture.

The disclosure now turns to FIGS. 7 and 8, which illustrate example hardware components and devices suitable for programming and applying service chains, routing traffic, and performing any other computing operations.

FIG. 7 illustrates an example network device 700 suitable for performing routing/switching operations, programming and applying service chains, etc. Network device 700 includes a master central processing unit (CPU) 704, interfaces 702, and a connection 710 (e.g., a PCI bus). When acting under the control of appropriate software or firmware, the CPU 704 is responsible for executing packet management, error detection, and/or routing functions.

The CPU 704 can accomplish these functions under the control of software including an operating system and any appropriate applications software. CPU 704 may include one or more processors 708 such as a processor from the Intel X86 family of microprocessors, the Motorola family of microprocessors or the MIPS family of microprocessors. In an alternative embodiment, processor 708 is specially designed hardware for controlling the operations of network device 700. In some cases, a memory 706 (such as non-volatile RAM, a TCAM, and/or ROM) can form part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM.

The independent processors may control communications and intensive tasks such as packet switching, media control, signal processing, crypto processing, function routing, execution endpoint management, network management, and so forth. By providing separate processors for the communications intensive tasks, these interfaces allow the master microprocessor 704 to efficiently perform routing computations, network diagnostics, security functions, etc.

Although the system shown in FIG. 7 is one specific network device of the present embodiments, it is by no means the only network device architecture on which the present embodiments can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various containers and virtualized execution environments and data.

The network device 700 can also include an application-specific integrated circuit (ASIC) 712, which can be configured to perform routing and/or switching operations. The ASIC 712 can communicate with other components in the network device 700 via the bus 710, to exchange data and signals and coordinate various types of operations by the network device 700, such as routing, switching, and/or data storage operations, for example.

FIG. 8 illustrates an example architecture of a system 800, including various hardware computing components which are in electrical communication with each other using a connection 806. System 800 includes a processing unit (CPU or processor) 804 and a system connection 806 that couples various system components including the system memory 820, such as read only memory (ROM) 818 and random access memory (RAM) 816, to the processor 804.

The system 800 can include a cache of high-speed memory connected directly with, in close proximity to, or integrated as part of the processor 804. The system 800 can copy data from the memory 820 and/or the storage device 808 to the cache 802 for quick access by the processor 804. In this way, the cache can provide a performance boost that avoids processor 804 delays while waiting for data. These and other modules can control or be configured to control the processor 804 to perform various actions. Other system memory 820 may be available for use as well. The memory 820 can include multiple different types of memory with different performance characteristics.

The processor 804 can include any general purpose processor and a service component, such as service 1 810, service 2 812, and service 3 814 stored in storage device 808, configured to control the processor 804 as well as a special-purpose processor where software instructions are incorporated into the actual processor design. The processor 804 may essentially be a completely self-contained computing system, containing multiple cores or processors, a bus, memory controller, cache, etc. A multi-core processor may be symmetric or asymmetric.

To enable user interaction with the computing device 800, an input device 822 can represent any number of input mechanisms, such as a microphone for speech, a touch-sensitive screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing device 800. The communications interface 826 can generally govern and manage the user input and system output. There is no restriction on operating on any particular hardware arrangement and therefore the basic features here may easily be substituted for improved hardware or firmware arrangements as they are developed.

Storage device 808 can be a non-volatile memory, a hard disk, or any other type of computer readable media which can store data for access by a computer, such as magnetic cassettes, flash memory cards, solid state memory devices, digital versatile disks, cartridges, random access memories (RAMs) 816, read only memory (ROM) 818, and hybrids thereof. In some cases, storage device 808 can store an execution or runtime environment for executing code, one or more functions for execution via the execution or runtime environment, one or more resources (e.g., libraries, data objects, APIs, etc.), and so forth.

The system 800 can include an integrated circuit 828, such as an application-specific integrated circuit (ASIC) configured to perform various operations. The integrated circuit 828 can be coupled with the connection 806 in order to communicate with other components in the system 800.

The storage device 808 can include software services 810, 812, 814 for controlling the processor 804. In some cases, the software services 810, 812, 814 can include, for example, operating system or kernel services, application services, services associated with one or more functions, etc. Other hardware or software modules are contemplated. The storage device 808 can be connected to the system connection 806. In one aspect, a hardware module that performs a particular function can include the software component stored in a computer-readable medium in connection with the necessary hardware components, such as the processor 804, connection 806, output device 824, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
receiving an indication of one or more service chains to be configured for traffic between a private network and respective cloud domains;
collecting domain name system (DNS) information from DNS queries associated with the respective cloud domains;
spoofing DNS entries associated with the respective cloud domains, wherein the spoofed DNS entries define a reduced number of Internet Protocol (IP) addresses, identified in the collected DNS information, for the respective cloud domain;
creating, based on the spoofed DNS entries, IP-to-domain mappings for the respective cloud domains;
programming, based on the respective IP-to-domain mappings, the one or more service chains for traffic between the private network and the respective cloud domains; and
in response to receiving traffic having source information associated with the private network and destination information matching an IP address in the respective IP-to-domain mapping, routing the traffic through a respective one of the one or more service chain.

2. The method of claim 1, wherein collecting DNS information comprises:
forwarding the DNS queries associated with the respective cloud domains to one or more DNS servers;
receiving one or more DNS resolution results from the one or more DNS servers;
snooping the one or more DNS resolution results; and
identifying, based on the snooping, the DNS information associated with the respective cloud domains.

3. The method of claim 1, wherein the IP address associated with the respective cloud domain in the respective IP-to-domain mapping comprises at least one of a private IP address assigned to the respective cloud domain or a virtual IP address assigned to the respective cloud domain, the at least one of the private IP address or the virtual IP address corresponding to the spoofed DNS entries.

4. The method of claim 1, wherein the reduced number of IP addresses associated with the respective cloud domain comprises a subset of a total number of IP addresses allocated to the respective cloud domain, wherein the IP address in the respective IP-to-domain mapping associated with the respective cloud domain is from the subset of the total number of IP addresses allocated to the respective cloud domain.

5. The method of claim 4, wherein the subset of the total number of IP addresses allocated to the respective cloud domain is selected from the DNS information.

6. The method of claim 1, further comprising:
receiving one or more service chain configuration requests identifying the respective service chains to be configured for traffic between the private network site and respective cloud domains, wherein each of the respective service chains comprises a respective sequence of appliances for processing the traffic.

7. The method of claim 1, wherein each respective service chain is programmed via one or more policies configured to route, through the respective service chain, traffic having source information associated with the private network site and destination information matching the IP address in the respective IP-to-domain mapping associated with the respective cloud domain.

8. The method of claim 7, wherein the one or more policies comprise access control list (ACL) entries, the ACL entries comprising a respective ACL entry for each service in the respective service chain, and
wherein each respective ACL entry specifies a source address associated with the one or more endpoints in the private network site, a destination address comprising the IP address in the respective IP-to-domain mapping associated with the respective cloud domain, and an instruction to route traffic to the service when a source and destination of the traffic match the source address and the destination address in the respective ACL entry.

9. A system comprising:
at least one processor; and
at least one memory storing instructions which when executed by the at least one processor, causes the at least one processor to:
  receive an indication of one or more service chains to be configured for traffic between a private network and respective cloud domains;
  collect domain name system (DNS) information from DNS queries associated with the respective cloud domains;
  spoof DNS entries associated with the respective cloud domains, wherein the spoofed DNS entries define a reduced number of Internet Protocol (IP) addresses, identified in the collected DNS information, for the respective cloud domain;
  create, based on the spoofed DNS entries, IP-to-domain mappings for the respective cloud domains;
  program, based on the respective IP-to-domain mappings, the one or more service chains for traffic between the private network and the respective cloud domains; and
  in response to receiving traffic having source information associated with the private network and destination information matching an IP address in the respective IP-to-domain mapping, routing the traffic through a respective one of the one or more service chain.

10. The system of claim 9, further comprising instructions, which when executed by the at least on processor, causes the at least one processor to:
  forward the DNS queries associated with the respective cloud domains to one or more DNS servers;
  receive one or more DNS resolution results from the one or more DNS servers;
  snoop the one or more DNS resolution results; and
  identify, based on the snooping, the DNS information associated with the respective cloud domains.

11. The system of claim 9, wherein the IP address associated with the respective cloud domain in the respective IP-to-domain mapping comprises at least one of a private IP address assigned to the respective cloud domain or a virtual IP address assigned to the respective cloud domain, the at least one of the private IP address or the virtual IP address corresponding to the spoofed DNS entries.

12. The system of claim 9, wherein the reduced number of IP addresses associated with the respective cloud domain comprises a subset of a total number of IP addresses allocated to the respective cloud domain, wherein the IP address in the respective IP-to-domain mapping associated with the respective cloud domain is from the subset of the total number of IP addresses allocated to the respective cloud domain.

13. The system of claim 12, wherein the subset of the total number of IP addresses allocated to the respective cloud domain is selected from the DNS information.

14. The system of claim 9, further comprising instructions, which when executed by the at least on processor, causes the at least one processor to:
  receive one or more service chain configuration requests identifying the respective service chains to be configured for traffic between the private network site and respective cloud domains, wherein each of the respective service chains comprises a respective sequence of appliances for processing the traffic.

15. The system of claim 9, wherein each respective service chain is programmed via one or more policies configured to route, through the respective service chain, traffic having source information associated with the private network site and destination information matching the IP address in the respective IP-to-domain mapping associated with the respective cloud domain.

16. The system of claim 15, wherein the one or more policies comprise access control list (ACL) entries, the ACL entries comprising a respective ACL entry for each service in the respective service chain, and
  wherein each respective ACL entry specifies a source address associated with the one or more endpoints in the private network site, a destination address comprising the IP address in the respective IP-to-domain mapping associated with the respective cloud domain, and an instruction to route traffic to the service when a source and destination of the traffic match the source address and the destination address in the respective ACL entry.

17. At least one non-transitory computer readable medium storing instructions, which when executed by at least one processor, causes the at least one processor to:
  receive an indication of one or more service chains to be configured for traffic between a private network and respective cloud domains;
  collect domain name system (DNS) information from DNS queries associated with the respective cloud domains;
  spoof DNS entries associated with the respective cloud domains, wherein the spoofed DNS entries define a reduced number of Internet Protocol (IP) addresses, identified in the collected DNS information, for the respective cloud domain;
  create, based on the spoofed DNS entries, IP-to-domain mappings for the respective cloud domains;
  program, based on the respective IP-to-domain mappings, the one or more service chains for traffic between the private network and the respective cloud domains; and
  in response to receiving traffic having source information associated with the private network and destination information matching an IP address in the respective IP-to-domain mapping, routing the traffic through a respective one of the one or more service chain.

18. The at least one non-transitory computer readable medium of claim 17, further comprising instructions, which when executed by the at least on processor, causes the at least one processor to:
  forward the DNS queries associated with the respective cloud domains to one or more DNS servers;
  receive one or more DNS resolution results from the one or more DNS servers;
  snoop the one or more DNS resolution results; and
  identify, based on the snooping, the DNS information associated with the respective cloud domains.

19. The at least one non-transitory computer readable medium of claim 17, wherein the IP address associated with the respective cloud domain in the respective IP-to-domain mapping comprises at least one of a private IP address assigned to the respective cloud domain or a virtual IP address assigned to the respective cloud domain, the at least one of the private IP address or the virtual IP address corresponding to the spoofed DNS entries.

20. The least one non-transitory computer readable medium of claim 17, wherein the reduced number of IP addresses associated with the respective cloud domain comprises a subset of a total number of IP addresses allocated to the respective cloud domain, wherein the IP address in the respective IP-to-domain mapping associated with the respective cloud domain is from the subset of the total number of IP addresses allocated to the respective cloud domain.

\* \* \* \* \*